(12) United States Patent
Huang et al.

(10) Patent No.: US 11,601,596 B2
(45) Date of Patent: Mar. 7, 2023

(54) OPTICAL IMAGE STABILIZER, CAMERA MODULE AND ELECTRONIC DEVICE FOR IMPROVED SIGNAL TRANSMISSION AND IMAGE QUALITY

(71) Applicant: LARGAN DIGITAL CO., LTD., Taichung (TW)

(72) Inventors: Chen-Yi Huang, Taichung (TW); Lin An Chang, Taichung (TW); Ming-Ta Chou, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 0 days.

(21) Appl. No.: 17/362,286

(22) Filed: Jun. 29, 2021

(65) Prior Publication Data

US 2022/0232165 A1    Jul. 21, 2022

Related U.S. Application Data

(60) Provisional application No. 63/139,704, filed on Jan. 20, 2021.

(51) Int. Cl.
*H04N 5/232* (2006.01)
*H04N 5/225* (2006.01)

(52) U.S. Cl.
CPC ....... *H04N 5/23287* (2013.01); *H04N 5/2253* (2013.01)

(58) Field of Classification Search
CPC .......................... H04N 5/23287; H04N 5/2253
See application file for complete search history.

(56) References Cited

U.S. PATENT DOCUMENTS 9,013,586 B2    4/2015  Hsu et al.
9,264,618 B2    2/2016  Kim
(Continued)

FOREIGN PATENT DOCUMENTS

CN    207571371 U    7/2018
CN    108600608 B    9/2018
(Continued)

OTHER PUBLICATIONS

Taiwan Office Action dated Oct. 28, 2021 as received in application No. 110106057.
(Continued)

*Primary Examiner* — Padma Haliyur
(74) *Attorney, Agent, or Firm* — Maschoff Brennan

(57) ABSTRACT

An optical image stabilizer includes an electric circuit member, an image sensor, a driving member and a pressing member. The electric circuit member includes a fixed part, a movable part and a connection part. The fixed part surrounds the movable part. The connection part is connected to the fixed part and the movable part, and the movable part is movable through the connection part. The image sensor is electrically connected to the electric circuit member and disposed on the movable part. The driving member and the pressing member are coupled to the movable part to respectively move and keep the movable part. The connection part includes wire structures connected to and located between the fixed part and the movable part. The wire structures with pliability are connected to the movable part with no physical support. The wire structures each includes a circuit layer and an insulation layer stacked together.

12 Claims, 21 Drawing Sheets

(56) References Cited

U.S. PATENT DOCUMENTS

| | | |
|---|---|---|
| 9,541,769 B2 | 1/2017 | Ladwig et al. |
| 10,071,903 B2 | 9/2018 | Liu et al. |
| 10,447,931 B2 | 10/2019 | Hu et al. |
| 2008/0198249 A1* | 8/2008 | Tanimura ............. H04N 5/2253 348/294 |
| 2012/0013754 A1* | 1/2012 | Lee ..................... H01L 31/02 348/208.99 |
| 2019/0089902 A1* | 3/2019 | Wei ..................... G06F 1/1686 |
| 2019/0141248 A1 | 5/2019 | Hubert et al. |
| 2020/0036898 A1 | 1/2020 | Kuo et al. |
| 2020/0099317 A1 | 3/2020 | Wang et al. |
| 2020/0322534 A1 | 10/2020 | Lee |
| 2021/0006693 A1 | 1/2021 | Li |

FOREIGN PATENT DOCUMENTS

| | | | |
|---|---|---|---|
| CN | 209514186 U | 10/2019 | |
| WO | WO-2018018998 A1 * | 2/2018 | ............... G02B 7/02 |
| WO | 2020248444 A1 | 12/2020 | |

OTHER PUBLICATIONS

Indian Office Action dated Aug. 10, 2022 as received in application No. 202134038734.

* cited by examiner

OPTICAL IMAGE STABILIZER, CAMERA MODULE AND ELECTRONIC DEVICE FOR IMPROVED SIGNAL TRANSMISSION AND IMAGE QUALITY

RELATED APPLICATIONS

This application claims priority to U.S. Provisional Application 63/139,704, filed on Jan. 20, 2021, which is incorporated by reference herein in its entirety.

BACKGROUND

Technical Field

The present disclosure relates to an optical image stabilizer, a camera module and an electronic device, more particularly to an optical image stabilizer and a camera module applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing. In particular, the optical systems nowadays mostly have image stabilization function, which reducing blurry images associated with the motion of the optical systems or other imaging device during exposure so as to ensure good image quality in shooting.

However, the captured images require a physical wire to be transmitted to a processor for image-processing. The physical wire may be unwantedly stretched during compensation for the motion of the optical systems or other imaging device, generating mechanical interference with the physical wire. This will generate noise in image signal transmission, thereby causing a poor image effect. Therefore, how to improve the physical wire used for image signal transmission and maintain good image quality to meet high-standard requirements of electronic devices has become an important issue in the related field.

SUMMARY

According to one aspect of the present disclosure, an optical image stabilizer includes an electric circuit member, an image sensor, a driving member and a pressing member. The electric circuit member includes a fixed part, a movable part and a connection part. The fixed part surrounds the movable part. The connection part is connected to the fixed part and the movable part, and the movable part is movable with respect to the fixed part through the connection part. The image sensor is electrically connected to the electric circuit member and disposed on the movable part, and the image sensor is configured to convert an optical image signal into an electrical image signal. The driving member is coupled to the movable part to move the movable part with respect to the fixed part on a plane substantially in parallel with the image sensor. The pressing member is coupled to the movable part to keep the movable part on the plane substantially in parallel with the image sensor. The connection part includes a plurality of wire structures that are connected to and located between the fixed part and the movable part. The plurality of wire structures have pliability, and the plurality of wire structures are connected to the movable part with no physical support. Each of the plurality of wire structures includes a circuit layer and an insulation layer. The circuit layer is configured to transmit the electrical image signal. The insulation layer is stacked on the circuit layer.

According to another aspect of the present disclosure, a camera module includes an optical imaging unit and the aforementioned optical image stabilizer, wherein the image sensor of the optical image stabilizer is disposed on an image surface of the optical imaging unit.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
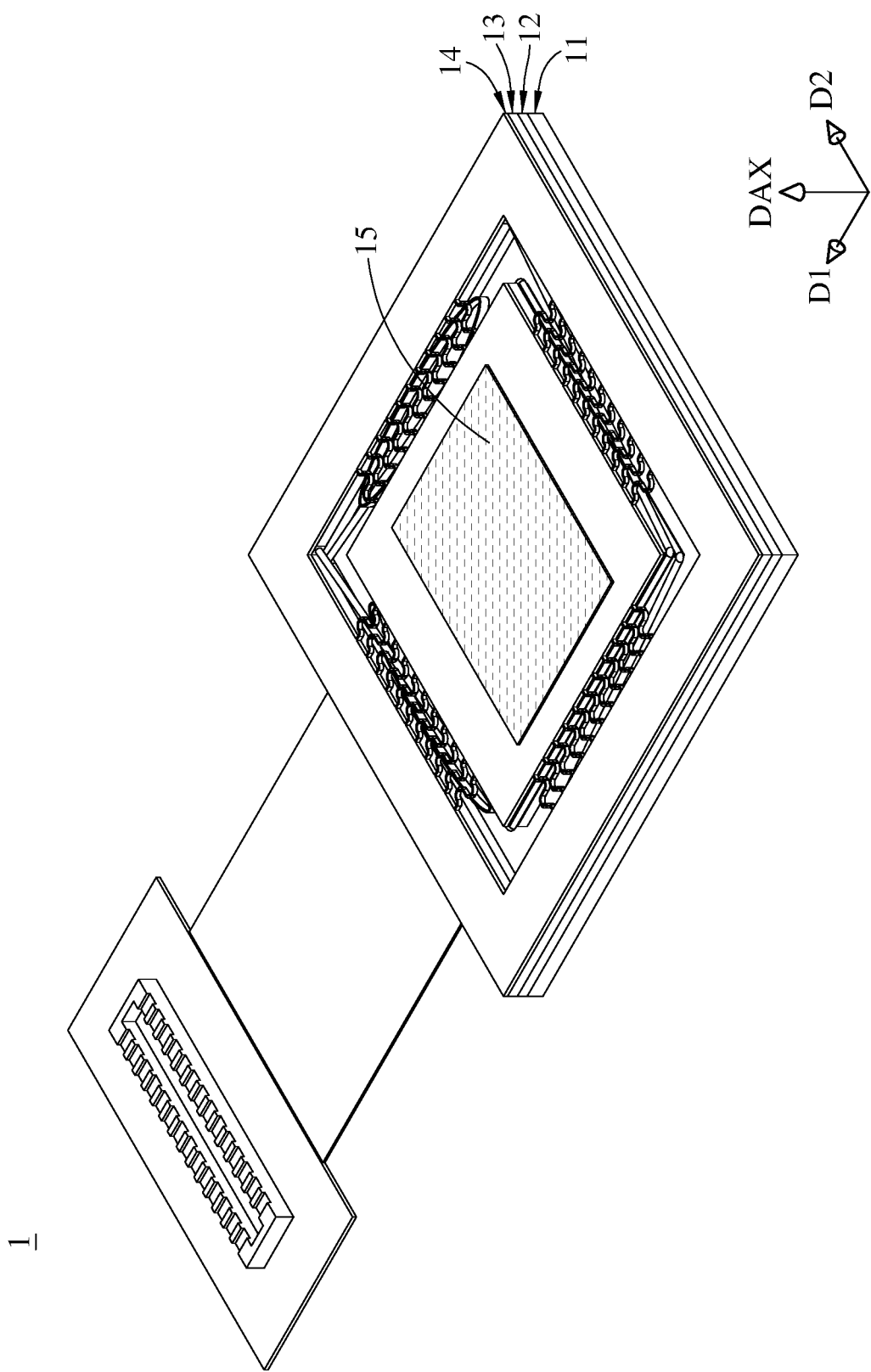
FIG. 1 is a perspective view of an optical image stabilizer according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an optical image stabilizer that includes an electric circuit member, an image sensor, a driving member and a pressing member. The electric circuit member includes a fixed part, a movable part and a connection part.

The fixed part surrounds the movable part. Moreover, the fixed part can surround the movable part in a loop shape. Please refer to FIG. 2 and FIG. 10, which show schematic views of the fixed parts 141 and 241 respectively surrounding the movable part 142 and 242 in loop shapes according to the 1st and 2nd embodiments. Moreover, the fixed part can surround the movable part in a manner that two ends of the fixed part are not connected to each other.

The connection part is connected to the fixed part and the movable part, and the movable part is movable with respect to the fixed part through the connection part. In specific, the connection part includes a plurality of wire structures that are connected to and located between the fixed part and the movable part. The wire structures have pliability, and the movable part is movable with respect to the fixed part through the pliability of the wire structures.

The fixed part, the movable part and the connection part of the electric circuit member can be substantially located on the same plane. Therefore, it is favorable for easily manufacturing a flat circuit board, thereby providing manufacturability for mass production.

The image sensor is configured to receive an optical image signal and then to convert the optical image signal into an electrical image signal. The image sensor is electrically connected to the electric circuit member so as to transmit the electrical image signal to the electric circuit member. The image sensor is disposed on the movable part so as to be movable along with the movable part with respect to the fixed part. Moreover, the image sensor can have an even shape.

The driving member is coupled to the movable part so as to move the movable part with respect to the fixed part on a plane substantially in parallel with the image sensor. Moreover, the driving member can be electrically, magnetically or physically coupled to the movable part so as to move the movable part via electricity, a magnetic force or a contact force.

Specifically, the driving member can include a first driving member and a second driving member. The first driving member can be coupled to the movable part in a first direction so as to move the movable part with respect to the fixed part along the first direction. The second driving member can be coupled to the movable part in a second direction so as to move the movable part with respect to the fixed part along the second direction. The second direction can be orthogonal to the first direction, and the first direction and the second direction can be in parallel with the surface of the image sensor. Therefore, it is favorable for providing driving forces of two dimensions for the image sensor, thereby increasing driving efficiency of optical image stabilization. Please refer to FIG. 2, which shows a schematic view of the first driving member 161 indirectly connected to the movable part 142 along the first direction D1 via the first central part 122 and the second central part 132, and the second driving member 162 indirectly connected to the movable part 142 along the second direction D2 via the second central part 132 according to the 1st embodiment of the present disclosure, wherein the first direction D1 and the second direction D2 are orthogonal to each other and are substantially in parallel with the upper surface (not numbered) of the image sensor 15.

The first driving member and the second driving member can each include at least one shape memory alloy (SMA). Moreover, the shape memory alloy can be titanium nickel alloy, titanium nickel palladium alloy, titanium nickel copper alloy, copper zinc alloy, copper zinc aluminum alloy, copper zinc tin alloy, titanium niobium alloy, cobalt nickel gallium alloy, cobalt nickel aluminum alloy, combination of any abovementioned two or more, etc., and the present disclosure is not limited thereto. While applying a bias voltage to the shape memory alloy, the shape memory alloy can change its length or shape and thus can generate a driving force of the driving member. Therefore, it is favorable for reducing power loss by arranging the driving member as the shape memory shape, thereby achieving miniaturization of the optical image stabilizer. Please refer to FIG. 2, which shows a schematic view of the first driving member 161 and the second driving member 162 including shape memory alloys according to the 1st embodiment of the present disclosure.

The first driving member and the second driving member can each include at least one piezoelectric material. Moreover, the piezoelectric material can be lead zirconate titanate (PZT), lithium niobate ($LiNbO_3$), barium titanate ($BaTiO_3$), lithium tantalate ($LiTaO_3$), strontium titanate ($SrTiO_3$), etc., and the present disclosure is not limited thereto. While applying a bias voltage to the piezoelectric material, the piezoelectric material can change its shape or generate vibration and thus can generate a driving force of the driving member. Therefore, it is favorable for providing a wide driving distance range by arranging the driving member as the piezoelectric material, thereby having high driving accuracy. Please refer to FIG. 10, which shows a schematic view of the first driving member 261 and the second driving member 262 including piezoelectric materials according to the 2nd embodiment of the present disclosure.

The driving force which the driving member applies to the movable part can be much larger than the restoring force which the wire structures applies to the movable part. Therefore, in the optical image stabilizer, the restoring force of the wire structures is a negligible mechanism factor, and the wire structures can be regarded as a connection to the movable part with no physical support. And, the position of the movable part is mainly controlled by the driving force of the driving member. Therefore, it is favorable for increasing the driving accuracy of the driving member applied to the movable part.

The pressing member is coupled to the movable part so as to keep the movable part on the plane substantially in parallel with the image sensor. Moreover, the pressing member can be electrically, magnetically or physically coupled to the movable part so as to keep the position of the movable part via electricity, a magnetic force or a contact force. Moreover, the pressing member can apply a force for supporting the movable part, and the cooperation of the force applied by the pressing member and the driving force of the driving member can prevent tilt of the movable part while moving the movable part. Moreover, the pressing member can be an elastic component, a ball component, a guide rod component, etc., and the present disclosure is not limited thereto. Please refer to FIG. 2, which shows a schematic view of the pressing member 17 including elastic components according to the 1st embodiment of the present disclosure. Please refer to FIG. 10, which shows a schematic view of the pressing member 27 including ball components according to the 2nd embodiment of the present disclosure.

Each wire structure includes a circuit layer and an insulation layer. The circuit layer is configured to transmit the electrical image signal. In specific, the image sensor is electrically connected to the movable part of the electric circuit member so as to transmit the electrical image signal to the movable part. Then, the electrical image signal is transmitted to the fixed part via the circuit layer of the wire structures of the connection part and then transmitted to a processing unit (not shown) for image processing. The insulation layer is stacked on the circuit layer. Moreover, the wire structures with pliability can be manufactured by performing an etching process on stacked circuit boards. Therefore, it is favorable for providing the wire structures with a low degree of mechanical interference, thereby reducing noise of signal transmission. The present disclosure provides a movable image sensor by arranging the pliable wire structures to achieve an optical image stabilization effect.

The number of the insulation layer in each wire structure can be two. The circuit layer in each wire structure is disposed between the two insulation layers, and at least one of the two insulation layers has a blackened surface. Therefore, it is favorable for reducing probability of generating non-imaging light.

Each wire structure can include at least one curved portion that has a curved shape, and the curved portions are located between two ends of the wire structures. Therefore, it is favorable for increasing the pliability characteristic of the wire structures so as to prevent damage of the wire structures while being moved. Please refer to FIG. 4 and FIG. 6, which show schematic views of the curved portions 1431c located between two ends of the wire structures 1431 according to the 1st embodiment of the present disclosure. Please refer to FIG. 12 and FIG. 14, which show schematic views of the curved portions 2431c located between two ends of the wire structures 2431 according to the 2nd embodiment of the present disclosure.

When a number of the wire structures is N, the following condition can be satisfied: N≥10. Therefore, it is favorable for providing stable image signal transmission.

When a width of a cross section of each wire structure is d, and a distance between two ends of each wire structure is W, the following condition can be satisfied: d/W≤0.2. Therefore, it is favorable for obtaining a balance between the manufacturing yield rate of the electric circuit member and the reliability of the wire structures. Please refer to FIG. 6 and FIG. 14, which show schematic views of parameters d and W respectively according to the 1st and 2nd embodiments of the present disclosure.

According to the present disclosure, the optical image stabilizer can further include a plastic member that can be disposed on the movable part. The plastic member can have an opening that can surround the image sensor. Moreover, the plastic member can further include at least one abut structure, and the abut structure can abut on at least one of the driving member and the pressing member. Moreover, the plastic member can be directly molded on the electric circuit member by injection molding; alternatively, the plastic member can be fixed on the electric circuit member via adhesive; the present disclosure is not limited thereto. Therefore, it is favorable for preventing exposing electronic parts on the electric circuit member by arranging the plastic member, which is favorable for blocking stray light on the image sensor periphery. Please refer to FIG. 10, which shows a schematic view of the plastic member 28 disposed on the movable part 242 according to the 2nd embodiment of the present disclosure, wherein the opening 281 of the plastic member 28 surrounds the image sensor 25, and the abut structure 282 of the plastic member 28 is indirectly abut on the second driving member 262 via the second driven part 232.

According to the present disclosure, the optical image stabilizer may further include a position sensor (not shown). The position sensor can detect the position of the movable part with respect to the fixed part and timely transmit the detection result. Therefore, it is favorable for increasing driving stability of the optical image stabilizer.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
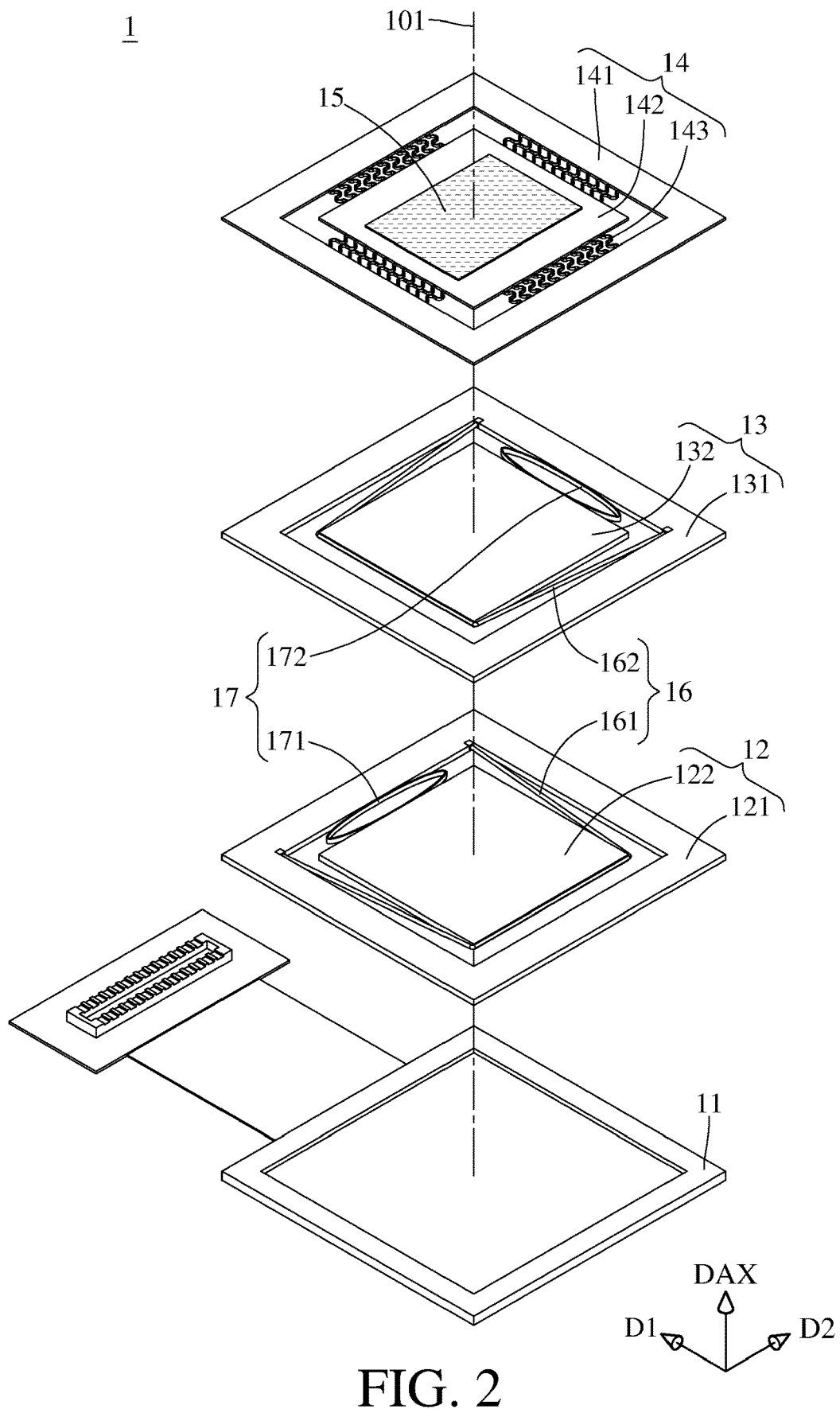
FIG. 2 is an exploded view of the optical image stabilizer in FIG. 1.
Figure 3:
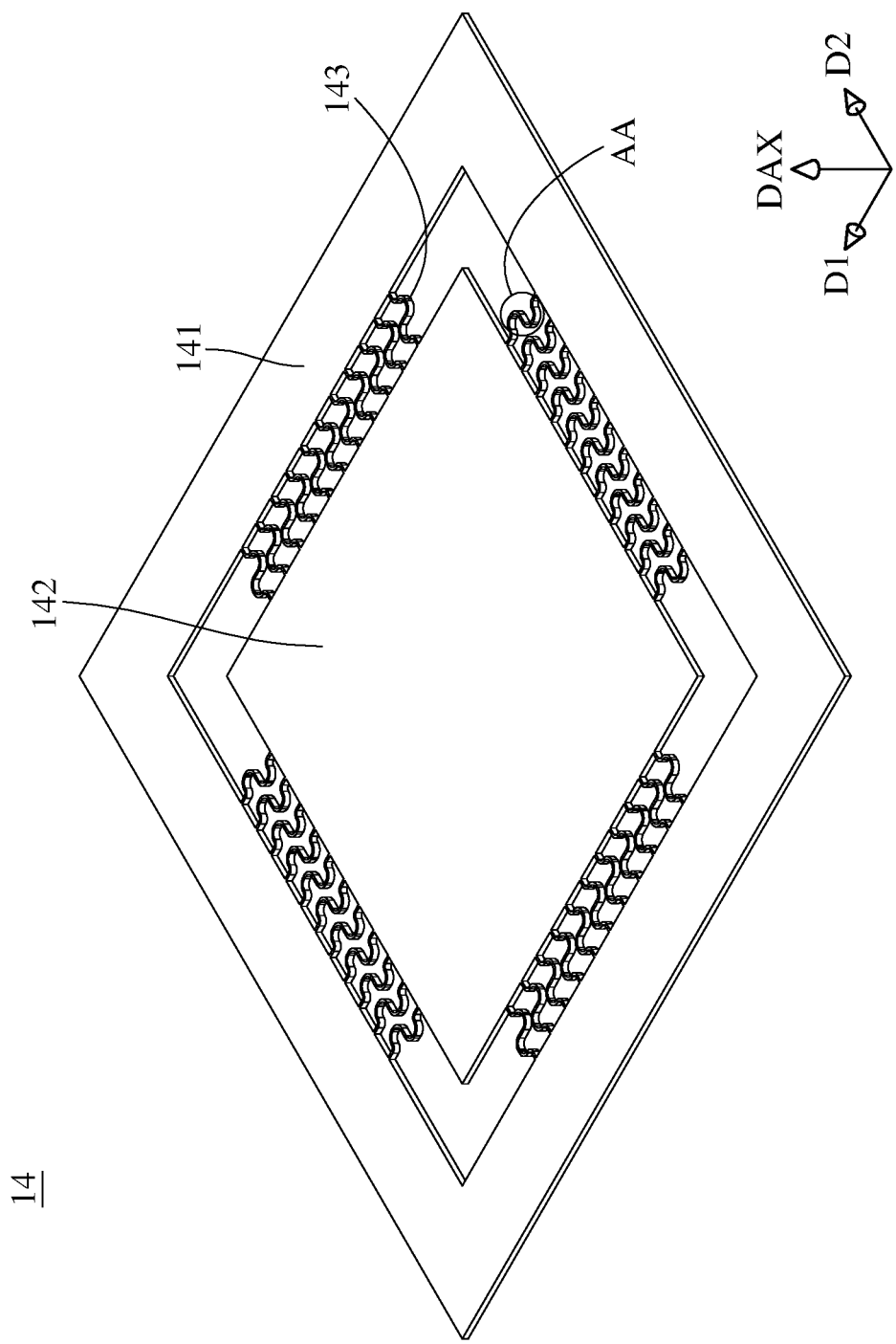
FIG. 3 is a perspective view of an electric circuit member of the optical image stabilizer in FIG. 2.
Figure 4:
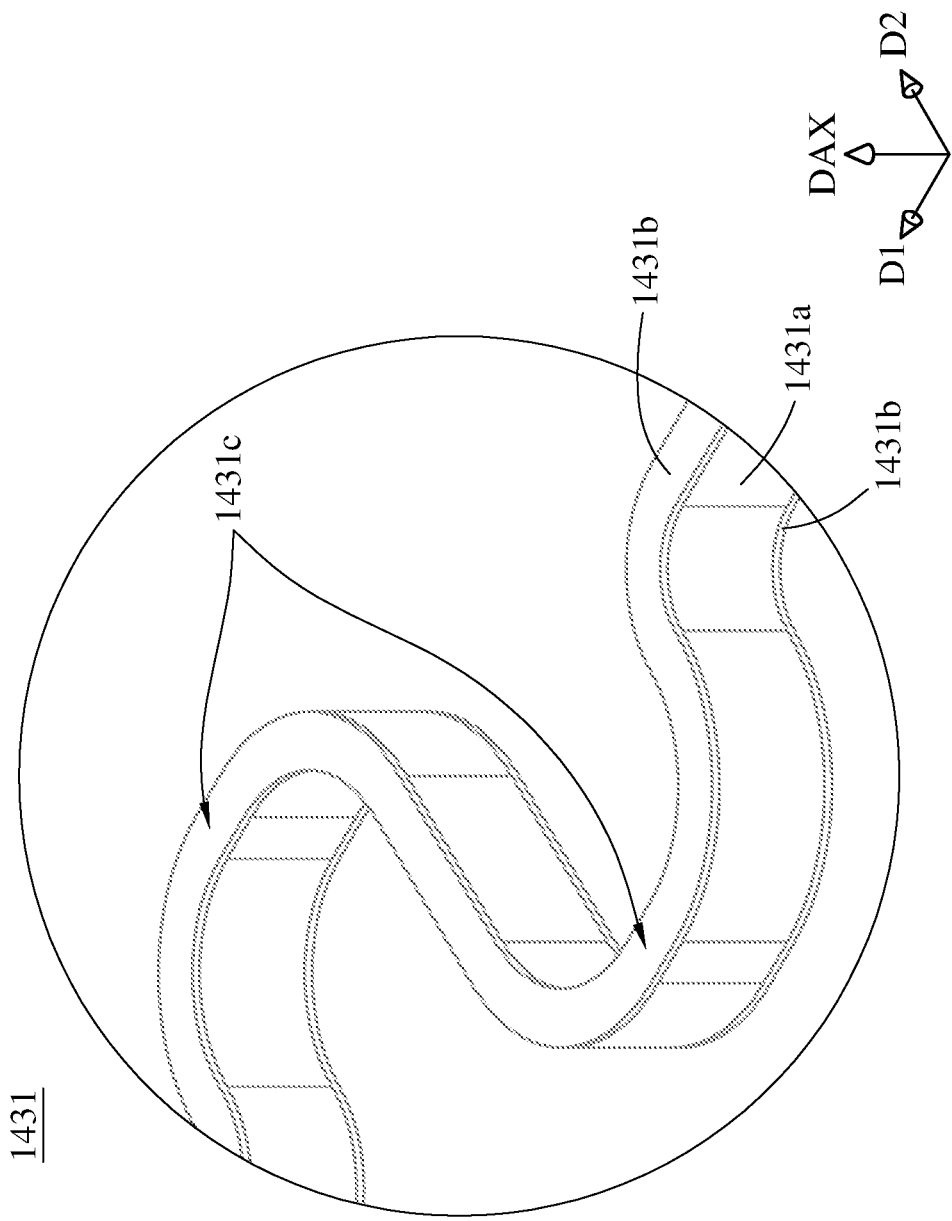
FIG. 4 is an enlarged view of the AA region of the electric circuit member in FIG. 3.
Figure 5:
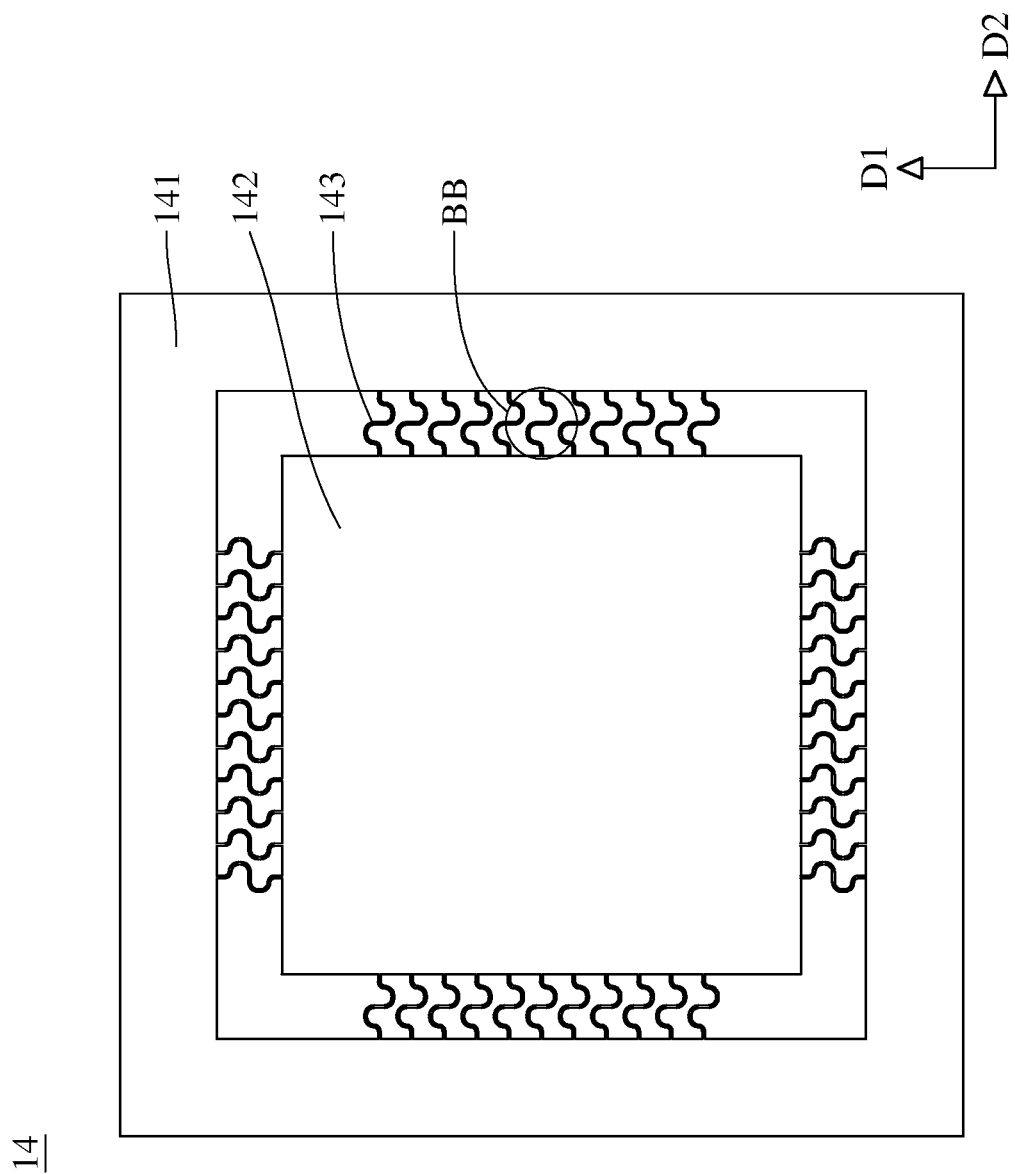
FIG. 5 is a top view of the electric circuit member in FIG. 3.
Figure 6:
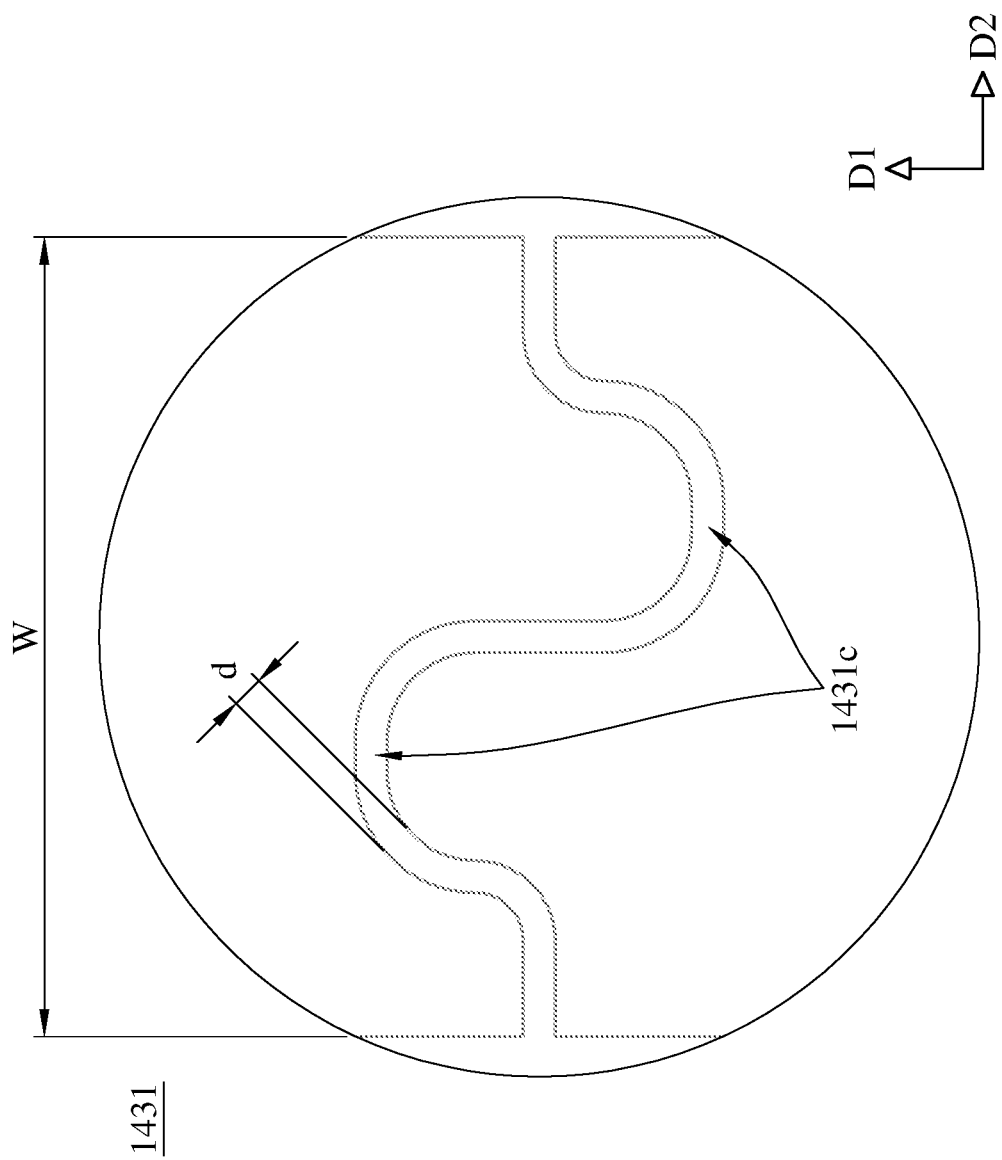
FIG. 6 is an enlarged view of the BB region of the electric circuit member in FIG. 5.
Figure 7:
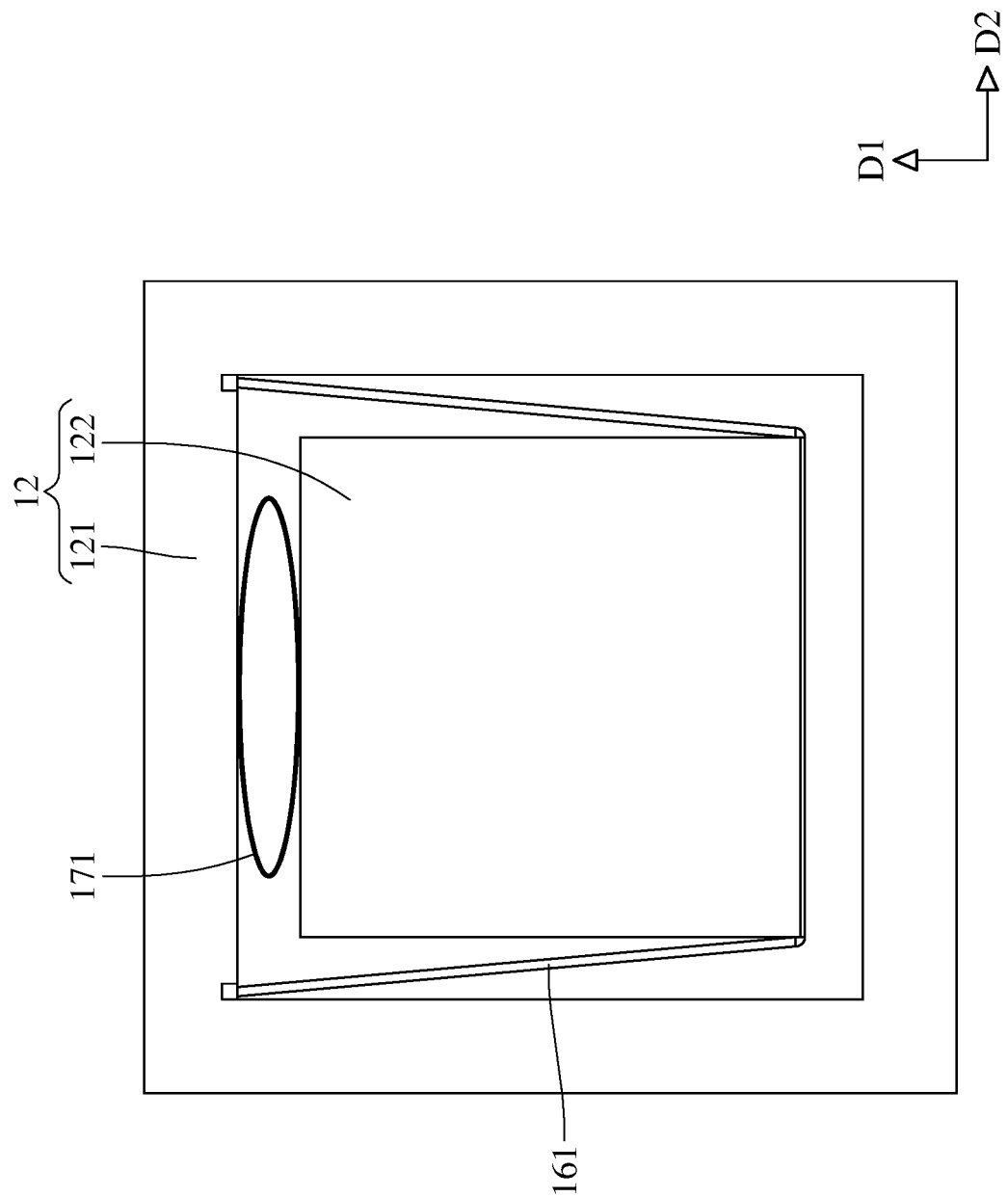
FIG. 7 is a top view of a first layer of the optical image stabilizer in FIG. 2.
Figure 8:
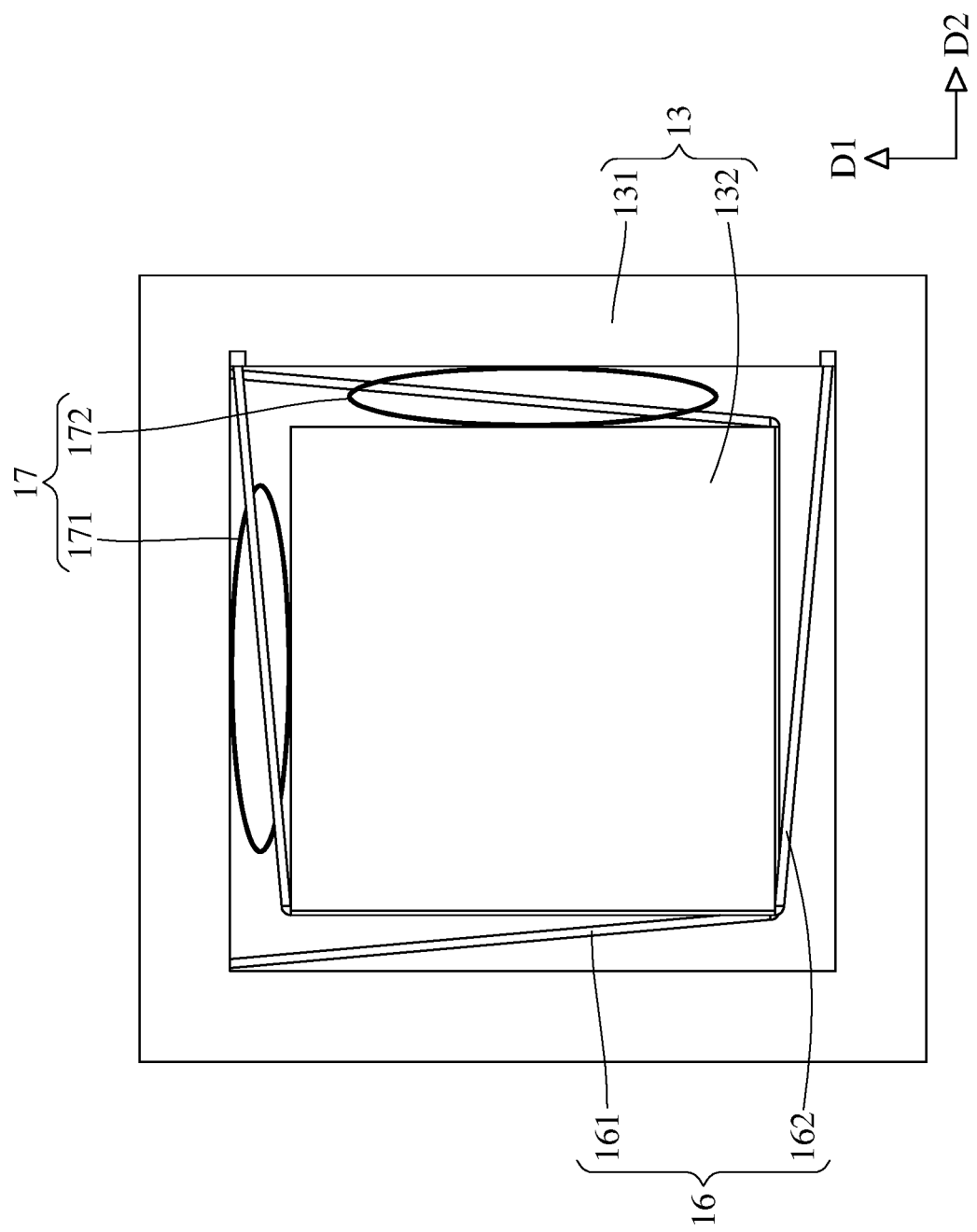
FIG. 8 is a top view of the first layer and a second layer of the optical image stabilizer in FIG. 2.

Please refer to FIG. 1 to FIG. 8, where FIG. 1 is a perspective view of an optical image stabilizer according to the 1st embodiment of the present disclosure, FIG. 2 is an exploded view of the optical image stabilizer in FIG. 1, FIG. 3 is a perspective view of an electric circuit member of the optical image stabilizer in FIG. 2, FIG. 4 is an enlarged view of the AA region of the electric circuit member in FIG. 3, FIG. 5 is a top view of the electric circuit member in FIG. 3, FIG. 6 is an enlarged view of the BB region of the electric circuit member in FIG. 5, FIG. 7 is a top view of a first layer of the optical image stabilizer in FIG. 2, and FIG. 8 is a top view of the first layer and a second layer of the optical image stabilizer in FIG. 2.

In this embodiment, an optical image stabilizer 1 includes a base 11, a first layer 12, a second layer 13, an electric circuit member 14, an image sensor 15, a driving member 16 and a pressing member 17. The optical image stabilizer 1 has an optical axis 101, and the optical axis 101 defines an optical axis direction DAX. The base 11, the first layer 12, the second layer 13, the electric circuit member 14 and the image sensor 15 are sequentially stacked along the optical axis direction DAX. The driving member 16 and the pressing member 17 are indirectly connected to the electric circuit member 14.

In detail, the first layer 12 includes a first outer part 121 and a first central part 122. The first outer part 121 is disposed on the base 11 and surrounds the first central part 122 in a loop shape. The first central part 122 is in indirect contact with the first outer part 121 via the driving member 16 and the pressing member 17. The second layer 13 includes a second outer part 131 and a second central part 132. The second outer part 131 is disposed on the first outer part 121 and surrounds the second central part 132 in a loop shape. The second central part 132 is disposed on the first central part 122.

The electric circuit member 14 includes a fixed part 141, a movable part 142 and a connection part 143 that are substantially located in the same plane. The fixed part 141 is disposed on the second outer part 131 and surrounds the movable part 142 in a loop shape. The movable part 142 is disposed on the second central part 132. The connection part 143 is connected to the fixed part 141 and the movable part 142, and the movable part 142 is movable with respect to the fixed part 141 via the connection part 143.

Specifically, the connection part 143 includes a plurality of wire structures 1431 that are connected to and located between the fixed part 141 and the movable part 142. The wire structures 1431 have pliability, and the movable part 142 is movable with respect to the fixed part 141 through the pliability of the wire structures 1431.

The image sensor 15 is configured to receive an optical image signal. For example, the image sensor 15 can have an even shape, and its upper surface (not numbered) is disposed on an image surface (not shown) of an optical system (not shown) for receiving the optical image signal imaged on the image surface of the optical system. And, the image sensor 15 is configured to convert the optical image signal into an electrical image signal. The image sensor 15 is electrically connected to the electric circuit member 14 so as to transmit the electrical image signal to the electric circuit member 14. The image sensor 15 is disposed on the movable part 142 in a manner that its lower surface faces the movable part 142, and the image sensor 15 is movable along with the movable part 142 with respect to the fixed part 141.

The driving member 16 includes a first driving member 161 and a second driving member 162, and the first driving member 161 and the second driving member 162 each include a shape memory alloy. Two ends of the first driving member 161 are connected to the first outer part 121, the middle portion of the first driving member 161 is in physical contact with a side of the first central part 122 along a first direction D1, and the first central part 122 is not in physical contact with the base 11. While applying a bias voltage to the first driving member 161 of the shape memory alloy, the first driving member 161 will change its length or shape and thus will generate a driving force on the side of the first central part 122 along the first direction D1. Since the first central part 122, the second central part 132 and the movable part 142 are stacked together and thus can be moved together, the first driving member 161 can be considered to be indirectly connected to the movable part 142 along the first direction D1. Accordingly, the first driving member 161 can move the movable part 142 with respect to the fixed part 141 along the first direction D1.

Two ends of the second driving member 162 are connected to the second outer part 131, and the middle portion of the second driving member 162 is in physical contact with a side of the second central part 132 along a second direction D2. While applying a bias voltage to the second driving member 162 of the shape memory alloy, the second driving member 162 will change its length or shape and thus will generate a driving force on the side of the second central part 132 along the second direction D2. Since the second central part 132 and the movable part 142 are stacked together and thus can be moved together, the second driving member 162 can be considered to be indirectly connected to the movable part 142 along the second direction D2. Accordingly, the second driving member 162 can move the movable part 142 with respect to the fixed part 141 along the second direction D2. As shown in FIG. 2, the first direction D1 and the second direction D2 are orthogonal to each other and are in parallel with the upper surface of the image sensor 15, such that the driving member 16 can move the movable part 142 with respect to the fixed part 141 on a plane substantially in parallel with the upper surface of the image sensor 15, and the optical image signal can be stably received by the image sensor 15.

The driving force which the driving member 16 applies to the movable part 142 is much larger than the restoring force which the wire structures 1431 of the connection part 143 applies to the movable part 142. Therefore, in the optical image stabilizer 1, the restoring force which the wire structures 1431 applies to the movable part 142 is a negligible mechanism factor, and the wire structures 1431 can be regarded as a connection to the movable part 142 with no physical support. And, the position of the movable part 142 is mainly controlled by the driving force of the driving member 16.

The pressing member 17 includes a first pressing member 171 and a second pressing member 172, and the first pressing member 171 and the second pressing member 172 each include an elastic component. The first pressing member 171 is in physical contact between the first outer part 121 and the first central part 122 along the first direction D1, and the first pressing member 171 and the first driving member 161 are respectively in physical contact with two opposite sides of the first central part 122 along the first direction D1. While applying a bias voltage to the first driving member 161, the first pressing member 171 can indirectly apply a force for supporting or restoring the movable part 142 along the first direction D1 via the first central part 122 and the second central part 132. And, the cooperation of the force applied by the first pressing member 171 and the driving force of the first driving member 161, which act on the first central part 122 along the first direction D1, can prevent tilt of the movable part 142 during movement, thereby enhancing stability of the image sensor 15 for receiving the optical image signal.

The second pressing member 172 is in physical contact between the second outer part 131 and the second central part 132 along the second direction D2, and the second pressing member 172 and the second driving member 162 are respectively in physical contact with two opposite sides of the second central part 132 along the second direction D2. While applying a bias voltage to the second driving member 162, the second pressing member 172 can indirectly apply a force for supporting or restoring the movable part 142 along the second direction D2 via the second central part 132. And, the cooperation of the force applied by the second pressing member 172 and the driving force of the second driving member 162, which act on the second central part 132 along the second direction D2, can prevent tilt of the movable part 142 during movement, thereby enhancing stability of the image sensor 15 for receiving the optical image signal. Therefore, the movable part 142 can be kept on the plane substantially in parallel with the upper surface of the image sensor 15.

In this embodiment, the first driving member 161 and the second driving member 162 of the driving member 16 are respectively disposed in the first layer 12 and the second layer 13, and the first pressing member 171 and the second pressing member 172 of the pressing member 17 are respectively disposed in the first layer 12 and the second layer 13. The first driving member 161 and the first pressing member 171 as well as the second driving member 162 and the second pressing member 172 can form two groups of driving forces so as to respectively move the movable part 142 along the first direction D1 and the second direction D2. Please refer to FIG. 7, which shows a top view of the first driving member 161 and the first pressing member 171 located in a single layer of the first layer 12. Please refer to FIG. 8, which shows a top view of the first driving member 161, the second driving member 162, the first pressing member 171 and the second pressing member 172 located in stacked layers of the first layer 12 and the second layer 13. However, the present disclosure is not limited thereto.

Each wire structure 1431 includes a circuit layer 1431a and two insulation layers 1431b. The circuit layer 1431a is stacked between the insulation layers 1431b, and the circuit layer 1431a is configured to transmit the electrical image signal. Specifically, the image sensor 15 is electrically connected to the movable part 142 of the electric circuit member 14 so as to transmit the electrical image signal to the movable part 142. Then, the electrical image signal is transmitted to the fixed part 141 via the circuit layer 1431a of the wire structures 1431 of the connection part 143 and then transmitted to a processing unit (not shown) for image processing. The wire structures 1431 with pliability are manufactured by performing an etching process on stacked circuit boards. Therefore, the wire structures 1431 can be provided with a low degree of mechanical inference so as to reduce noise of signal transmission, thereby stably moving the image sensor 15 and achieving an optical image stabilization effect.

One of the insulation layers 1431b located close to the image sensor 15 has a blackened surface (not shown) along the optical axis direction DAX so as to reduce probability of generating non-imaging light. However, the present disclosure is not limited thereto. In some other embodiments, each insulation layer can have a blackened surface at a side thereof away from the circuit layer.

Each wire structure 1431 further include two curved portions 1431c. As shown in FIG. 4 and FIG. 6, each curved portion 1431c has a curved shape, and the curved portions 1431c are located between two ends of the wire structures 1431 so as to increase the pliability characteristic of the wire structures 1431 for preventing damage of the wire structures 1431 while being moved.

When a number of the wire structures 1431 is N, the following condition is satisfied: N=44.

When a width of a cross section of each wire structure 1431 is d, and a distance between two ends of each wire structure 1431 is W, the following conditions are satisfied: d=0.04 [mm]; W=1 [mm]; and d/W=0.04.

2nd Embodiment

Figure 9:
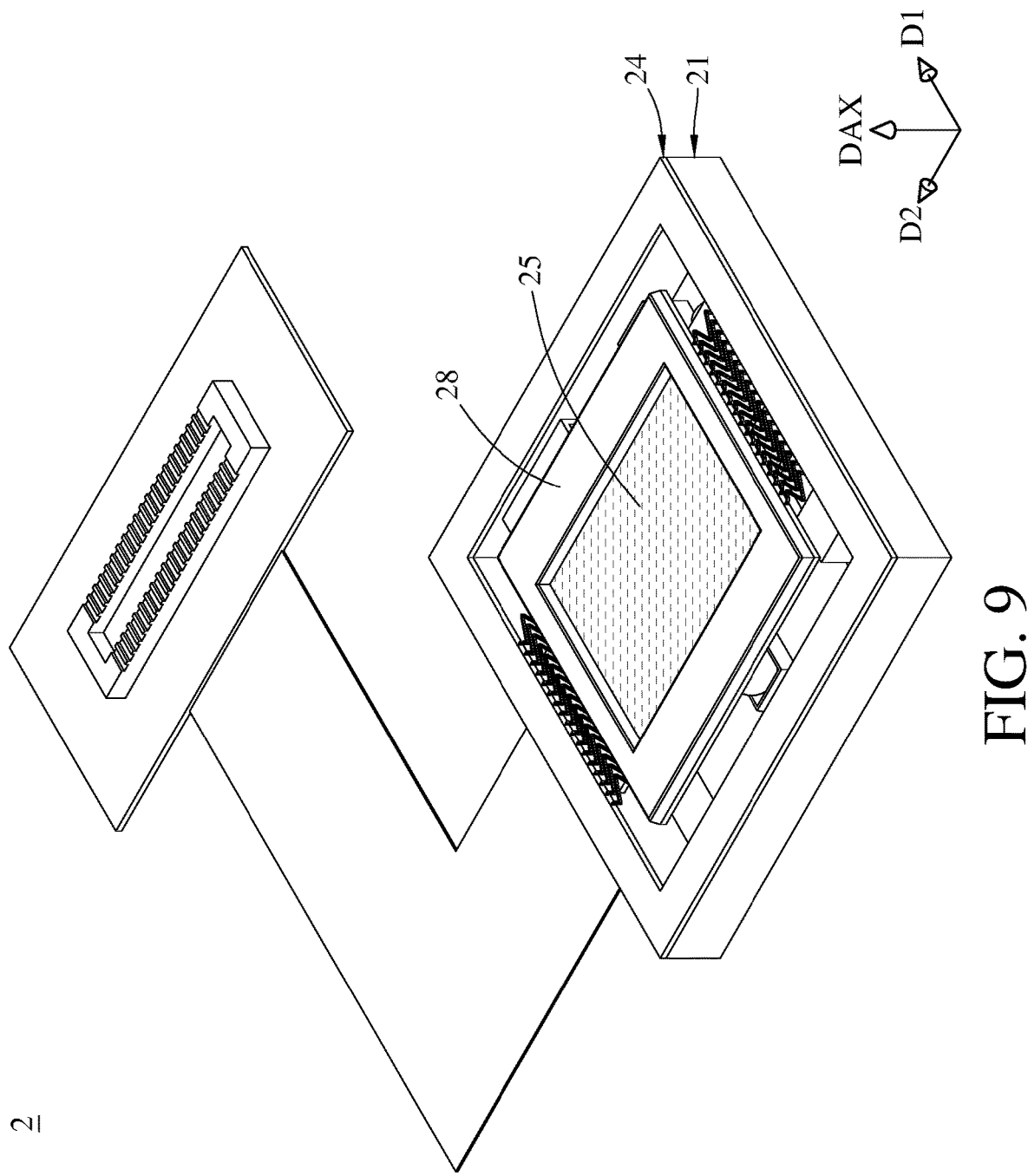
FIG. 9 is a perspective view of an optical image stabilizer according to the 2nd embodiment of the present disclosure.
Figure 10:
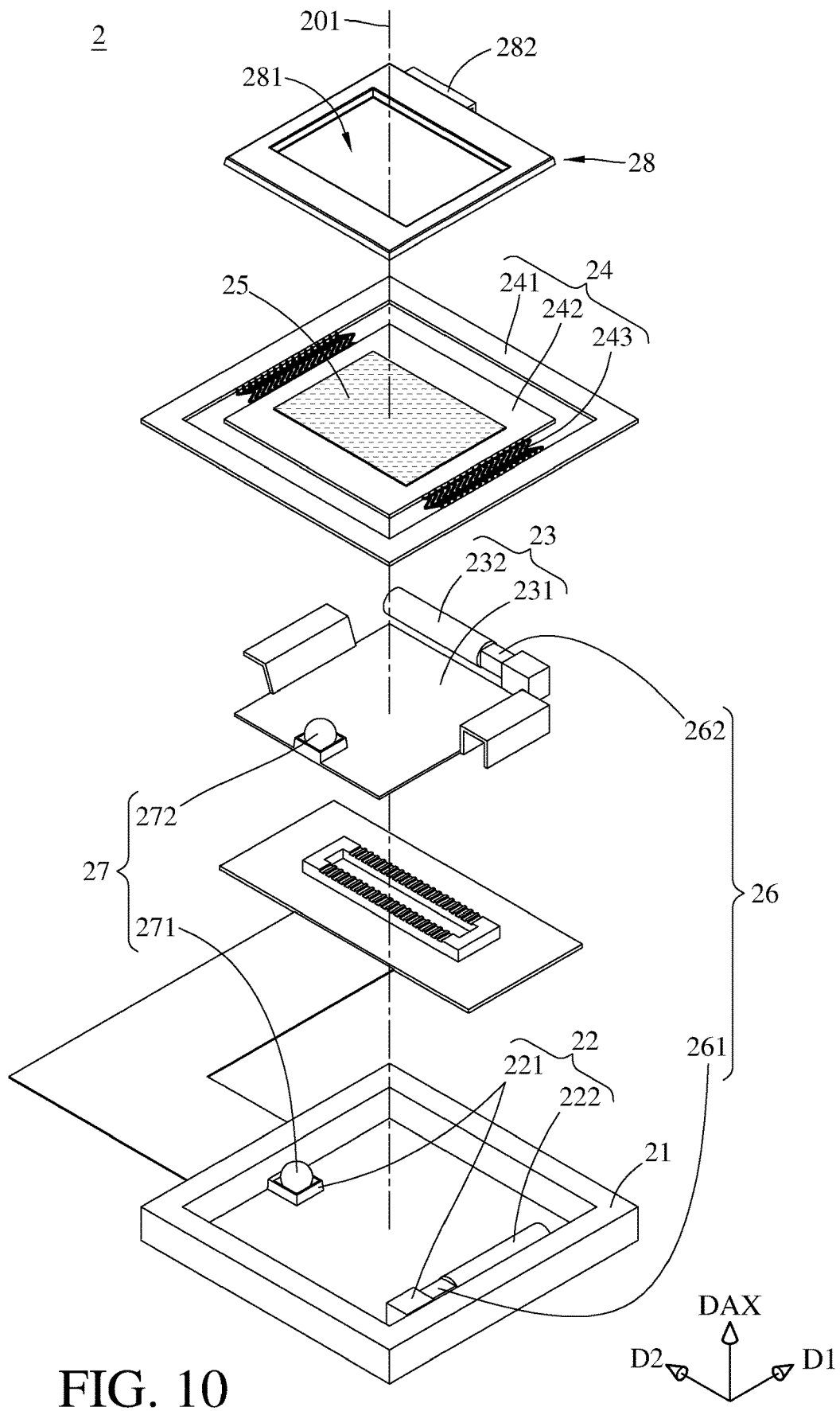
FIG. 10 is an exploded view of the optical image stabilizer in FIG. 9.
Figure 11:
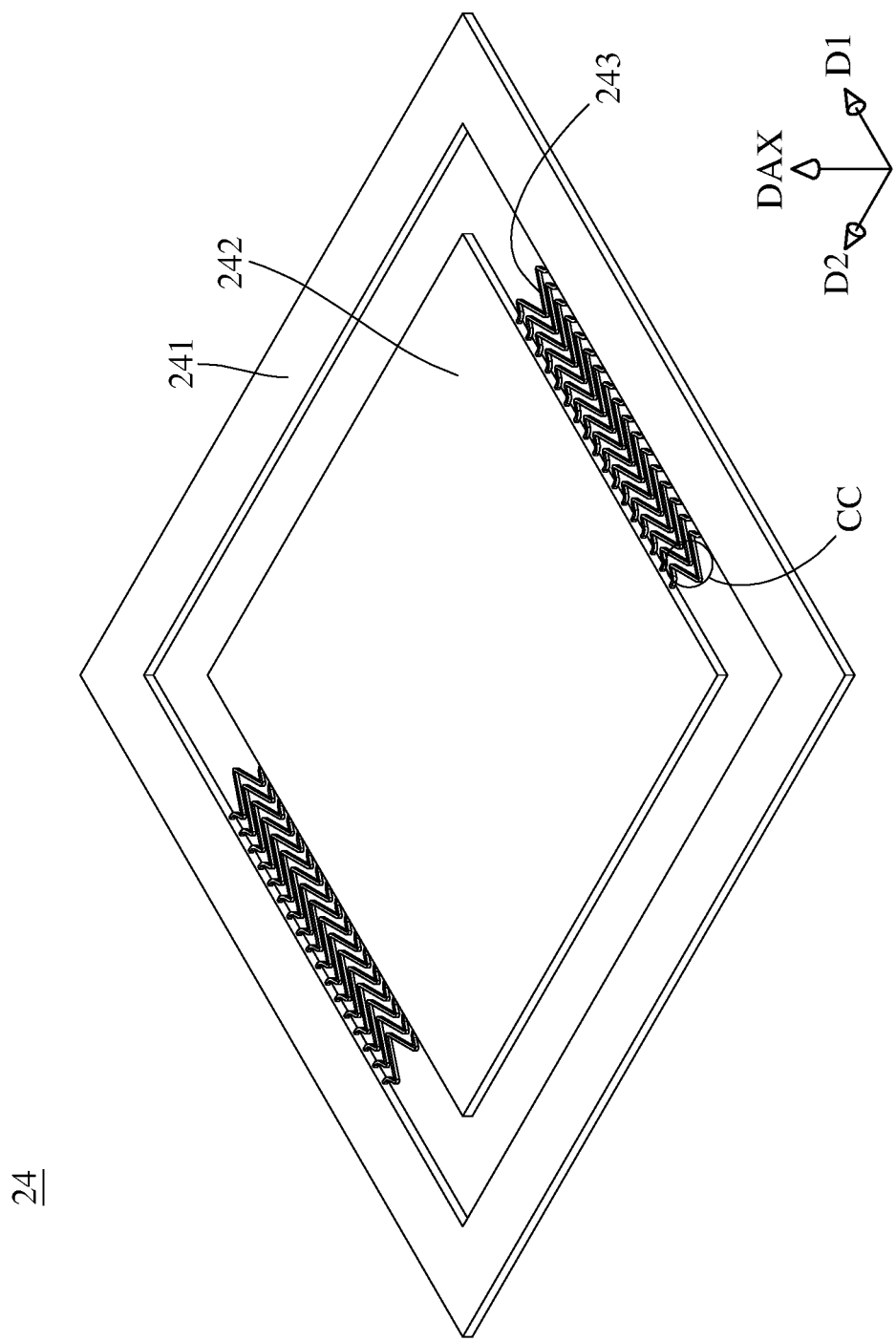
FIG. 11 is a perspective view of an electric circuit member of the optical image stabilizer in FIG. 10.
Figure 12:
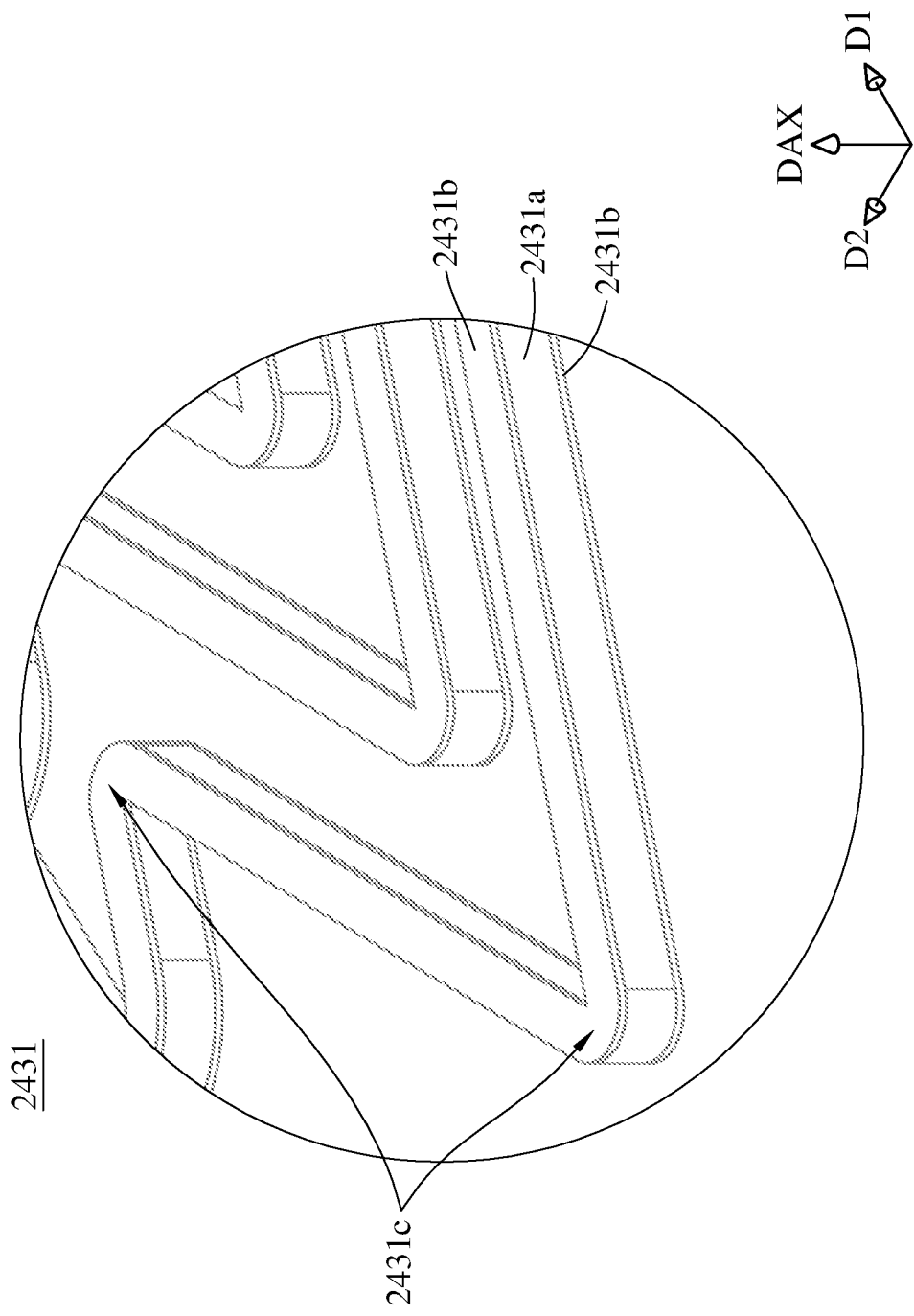
FIG. 12 is an enlarged view of the CC region of the electric circuit member in FIG. 11.
Figure 13:
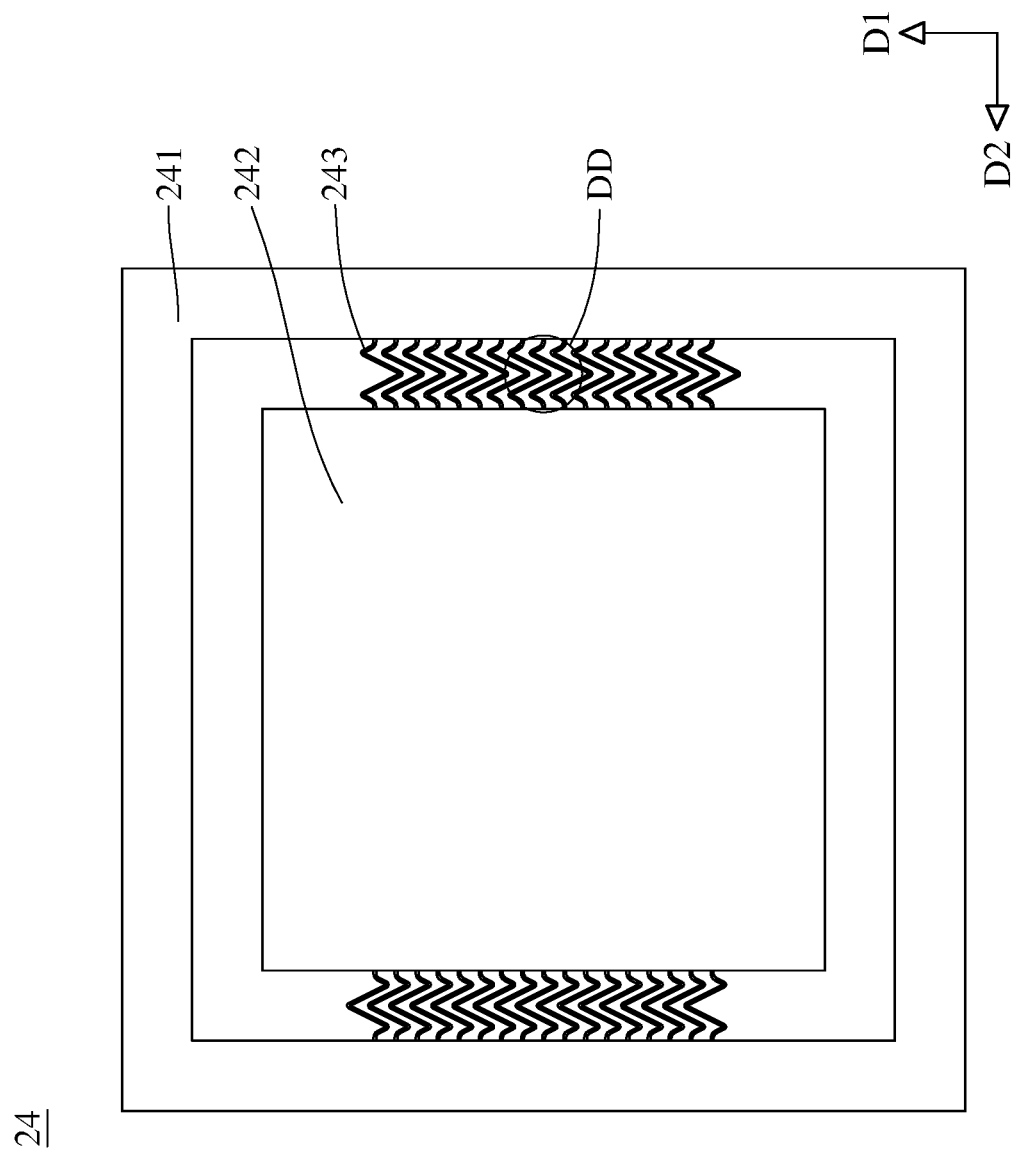
FIG. 13 is a top view of the electric circuit member in FIG. 11.
Figure 14:
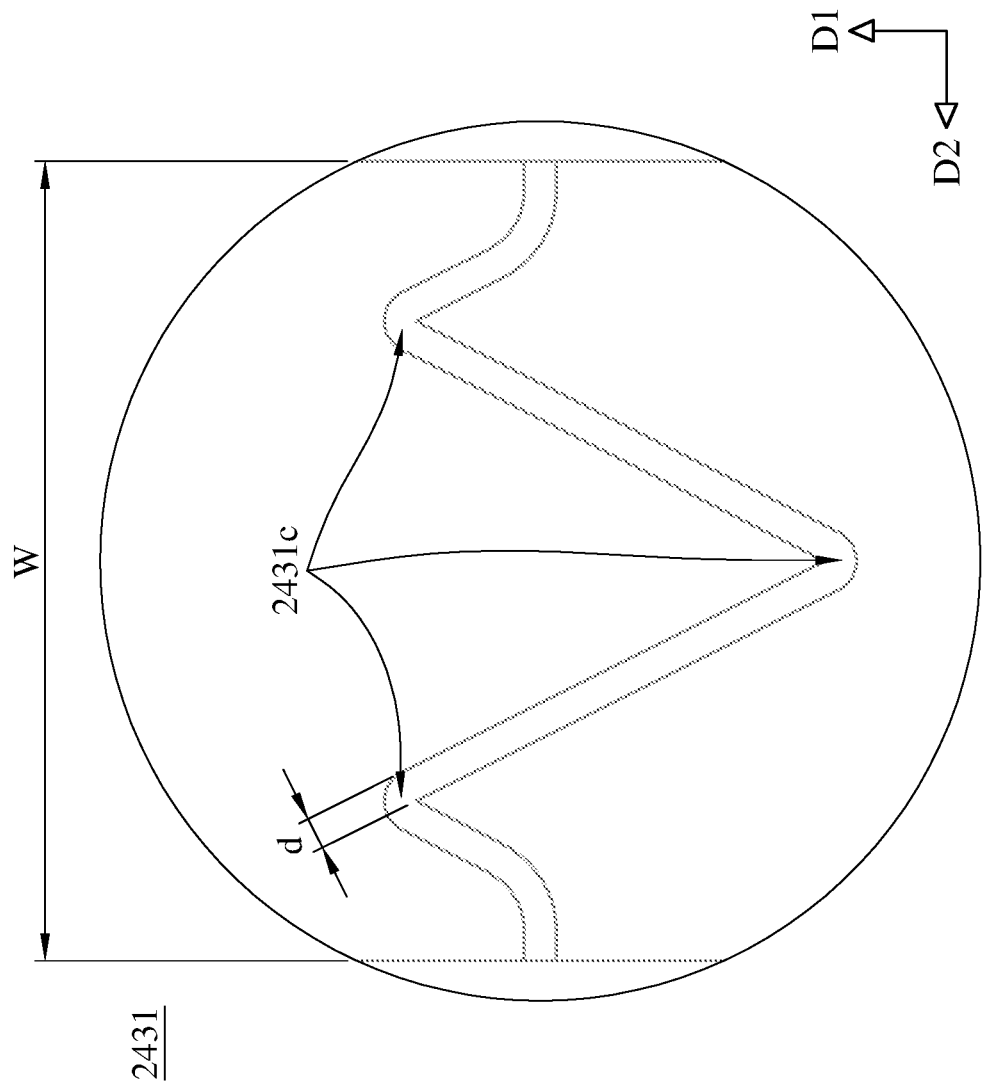
FIG. 14 is an enlarged view of the DD region of the electric circuit member in FIG. 13.

Please refer to FIG. 9 to FIG. 14, where FIG. 9 is a perspective view of an optical image stabilizer according to the 2nd embodiment of the present disclosure, FIG. 10 is an exploded view of the optical image stabilizer in FIG. 9, FIG. 11 is a perspective view of an electric circuit member of the optical image stabilizer in FIG. 10, FIG. 12 is an enlarged view of the CC region of the electric circuit member in FIG. 11, FIG. 13 is a top view of the electric circuit member in FIG. 11, and FIG. 14 is an enlarged view of the DD region of the electric circuit member in FIG. 13.

In this embodiment, an optical image stabilizer 2 includes a base 21, a first layer 22, a second layer 23, an electric circuit member 24, an image sensor 25, a driving member 26, a pressing member 27 and a plastic member 28. The optical image stabilizer 2 has an optical axis 201, and the optical axis 201 defines an optical axis direction DAX. The first layer 22 and the second layer 23 are sequentially stacked along the optical axis direction DAX within an accommodation space (not numbered) surrounded by the base 21. The base 21, the electric circuit member 24 and the image sensor 25 are sequentially stacked along the optical axis direction DAX. The driving member 26 and the pressing member 27 are indirectly connected to the electric circuit member 24. The plastic member 28 is disposed on the electric circuit member 24 and the second layer 23.

In detail, the first layer 22 includes a first carrier part 221 and a first driven part 222. The first carrier part 221 is connected to the base 21. The first driven part 222 is in indirect contact with the first carrier part 221 via the driving member 26. The second layer 23 includes a second carrier part 231 and a second driven part 232. The second carrier part 231 is disposed on the first driven part 222, and the second carrier part 231 is in indirect contact with the first carrier part 221 via the pressing member 27. The second driven part 232 is in indirect contact with the second carrier part 231 via the driving member 26.

The electric circuit member 24 includes a fixed part 241, a movable part 242 and a connection part 243 that are substantially located in the same plane. The fixed part 241 is disposed on the base 21 and surrounds the movable part 242 in a loop shape. The movable part 242 is in indirect contact with the second carrier part 231 via the pressing member 27 and in indirect contact with the second driven part 232 via the plastic member 28. The connection part 243 is connected to the fixed part 241 and the movable part 242, and the movable part 242 is movable with respect to the fixed part 241 via the connection part 243.

Specifically, the connection part 243 includes a plurality of wire structures 2431 that are connected to and located between the fixed part 241 and the movable part 242. The wire structures 2431 have pliability, and the movable part 242 is movable with respect to the fixed part 241 through the pliability of the wire structures 2431.

The image sensor 25 is configured to receive an optical image signal. For example, the image sensor 25 can have an even shape, and its upper surface (not numbered) is disposed on an image surface (not shown) of an optical system (not shown) for receiving the optical image signal imaged on the image surface of the optical system. And, the image sensor 25 is configured to convert the optical image signal into an electrical image signal. The image sensor 25 is electrically connected to the electric circuit member 24 so as to transmit the electrical image signal to the electric circuit member 24. The image sensor 25 is disposed on the movable part 242 in a manner that its lower surface faces the movable part 242, and the image sensor 25 is movable along with the movable part 242 with respect to the fixed part 241.

The driving member 26 includes a first driving member 261 and a second driving member 262, and the first driving member 261 and the second driving member 262 each include a piezoelectric material. The first driving member 261 is disposed between and in physical contact with the first carrier part 221 and the first driven part 222 along a first direction D1, so that the first carrier part 221 and the first driven part 222 are spaced from each other. And, the first driven part 222 is not in physical contact with the base 21. While applying a bias voltage to the first driving member 261 of the piezoelectric material, the first driving member 261 will change its shape or generate vibration and thus will generate a driving force on the first driven part 222 that is not in physical contact with the base 21 along the first direction D1. Since the first driven part 222 and the second carrier part 231 are stacked together and thus can be moved together, and the second carrier part 231 is in indirect contact with the movable part 242 via the pressing member 27, the first driving member 261 can be considered to be indirectly connected to the movable part 242 along the first direction D1. Accordingly, the first driving member 261 can move the movable part 242 with respect to the fixed part 241 along the first direction D1.

The second driving member 262 is disposed between and in physical contact with the second carrier part 231 and the second driven part 232 along a second direction D2, so that the second carrier part 231 and the second driven part 232 are space apart from each other. While applying a bias voltage to the second driving member 262 of the piezoelectric material, the second driving member 262 will change its shape or generate vibration and thus will generate a driving force on the second driven part 232 that is not in physical contact with the second carrier part 231 along the second direction D2. Since the second driven part 232 and the movable part 242 are in indirect contact with each other via the plastic member 28 and thus can be moved together, the second driving member 262 can be considered to be indirectly connected to the movable part 242 along the second direction D2. Accordingly, the second driving member 262 can move the movable part 242 with respect to the fixed part 241 along the second direction D2. As shown in FIG. 10, the first direction D1 and the second direction D2 are orthogonal to each other and are in parallel with the upper surface of the image sensor 25, such that the driving member 26 can move the movable part 242 with respect to the fixed part 241 on a plane substantially in parallel with the upper surface of the image sensor 25, and the optical image signal can be stably received by the image sensor 25.

The driving force which the driving member 26 applies to the movable part 242 is much larger than the restoring force which the wire structures 2431 of the connection part 243 applies to the movable part 242. Therefore, in the optical image stabilizer 2, the restoring force which the wire structures 2431 applies to the movable part 242 is a negligible mechanism factor, and the wire structures 2431 can be regarded as a connection to the movable part 242 with no physical support. And, the position of the movable part 242 is mainly controlled by the driving force of the driving member 26.

The pressing member 27 includes a first pressing member 271 and a second pressing member 272, and the first pressing member 271 and the second pressing member 272 each include a ball component. The first pressing member 271 is in physical contact between the first carrier part 221 and the second carrier part 231 along the optical axis direction DAX, and the first pressing member 271 of the ball component can roll at its original position without relative displacement with respect to the first carrier part 221. While applying a bias voltage to the first driving member 261, the first pressing member 271 can indirectly apply a force for supporting the movable part 242 along the optical axis direction DAX via the first carrier part 221 and the second carrier part 231. And, the cooperation of the force applied by the first pressing member 271 and the driving force of the first driving member 261, which act on the first driven part 222 along the first direction D1, can prevent tilt of the movable part 242 during movement, thereby enhancing stability of the image sensor 25 for receiving the optical image signal.

The second pressing member 272 is in physical contact between the second carrier part 231 and the movable part 242 along the optical axis direction DAX, and the second pressing member 272 of the ball component can roll at its original position without relative displacement with respect to the second carrier part 231. While applying a bias voltage to the second driving member 262, the second pressing member 272 can directly apply a force for supporting the movable part 242 along the optical axis direction DAX. And, the cooperation of the force applied by the second pressing member 272 and the driving force of the second driving member 262, which act on the second driven part 232 along the second direction D2, can prevent tilt of the movable part 242 during movement, thereby enhancing stability of the image sensor 25 for receiving the optical image signal. Therefore, the movable part 242 can be kept on the plane substantially in parallel with the upper surface of the image sensor 25.

In this embodiment, the first driving member 261 and the second driving member 262 of the driving member 26 are respectively disposed in the first layer 22 and the second layer 23, and the first pressing member 271 and the second pressing member 272 of the pressing member 27 are respectively disposed in the first layer 22 and the second layer 23. The first driving member 261 and the first pressing member 271 as well as the second driving member 262 and the second pressing member 272 can form two groups of driving forces so as to respectively move the movable part 242 along the first direction D1 and the second direction D2. Please refer to FIG. 10, which shows a perspective view of the first driving member 261 and the second driving member 262 that can move the movable part 242 respectively along the first direction D1 and the second direction D2, and the first pressing member 271 and the second pressing member 272 that can stable the movement of the movable part 242 respectively along the first direction D1 and the second direction D2. However, the present disclosure is not limited thereto.

Each wire structure 2431 includes a circuit layer 2431a and two insulation layers 2431b. The circuit layer 2431a is stacked between the insulation layers 2431b, and the circuit layer 2431a is configured to transmit the electrical image signal. Specifically, the image sensor 25 is electrically connected to the movable part 242 of the electric circuit member 24 so as to transmit the electrical image signal to the movable part 242. Then, the electrical image signal is transmitted to the fixed part 241 via the circuit layer 2431a of the wire structures 2431 of the connection part 243 and then transmitted to a processing unit (not shown) for image processing. The wire structures 2431 with pliability are manufactured by performing an etching process on stacked circuit boards. Therefore, the wire structures 2431 can be provided with a low degree of mechanical inference so as to reduce noise of signal transmission, thereby stably moving the image sensor 25 and achieving an optical image stabilization effect.

One of the insulation layers 2431b located close to the image sensor 25 has a blackened surface (not shown) along the optical axis direction DAX so as to reduce probability of generating non-imaging light. However, the present disclosure is not limited thereto. In some other embodiments, each insulation layer can have a blackened surface at a side thereof away from the circuit layer.

Each wire structure 2431 further include three curved portions 2431c. As shown in FIG. 12 and FIG. 14, each curved portion 2431c has a curved shape, and the curved portions 2431c are located between two ends of the wire structures 2431 so as to increase the pliability characteristic of the wire structures 2431 for preventing damage of the wire structures 2431 while being moved.

When a number of the wire structures 2431 is N, the following condition is satisfied: N=34.

When a width of a cross section of each wire structure 2431 is d, and a distance between two ends of each wire structure 2431 is W, the following conditions are satisfied: d=0.04 [mm]; W=1 [mm]; and d/W=0.04.

The plastic member 28 is disposed on the movable part 242. The plastic member 28 has an opening 281 that surrounds the image sensor 25. The plastic member 28 includes an abut structure 282. The abut structure 282 is disposed on the second driven part 232 and indirectly abuts on the second driving member 262 via the second driven part 232.

3rd Embodiment

Figure 15:
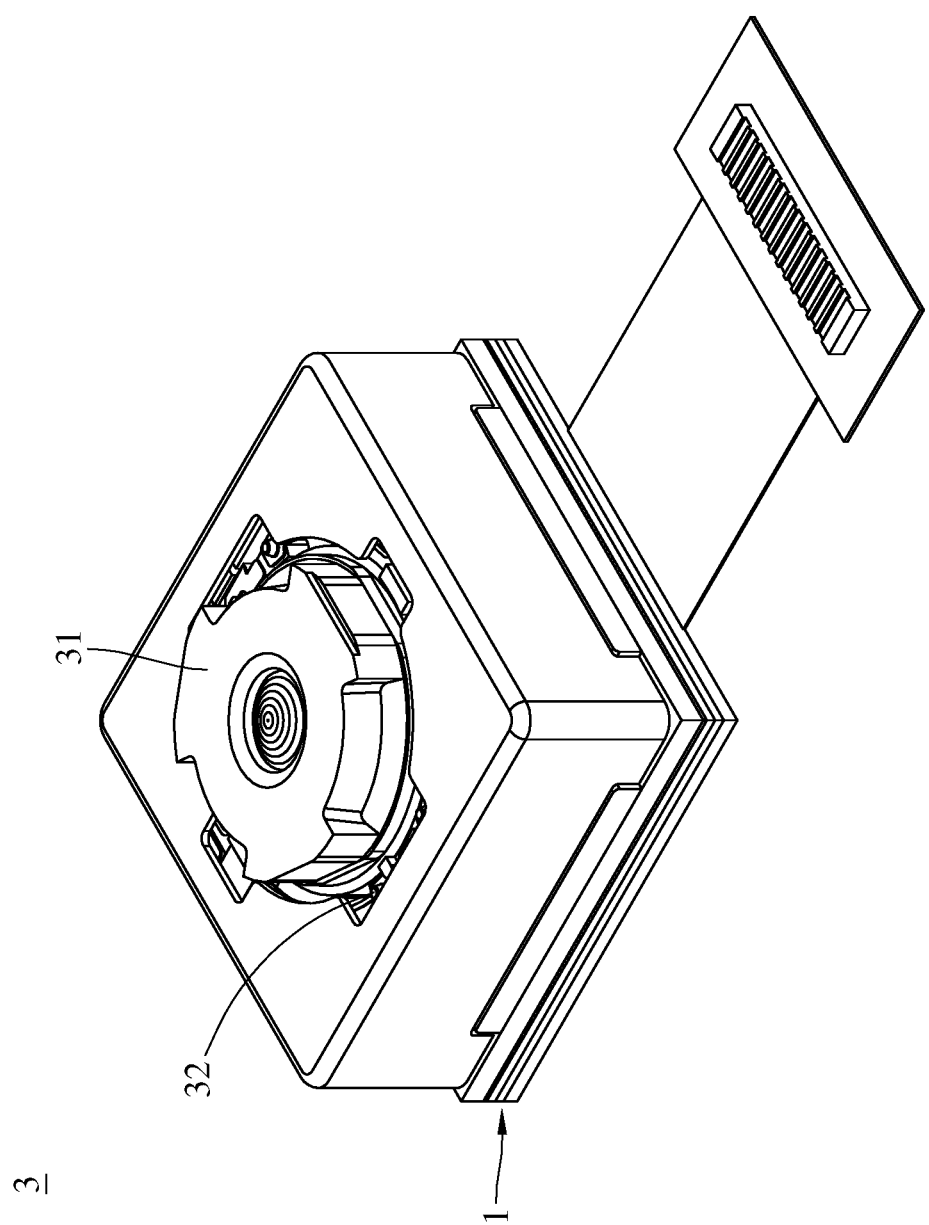
FIG. 15 is a perspective view of a camera module according to the 3rd embodiment of the present disclosure.

Please refer to FIG. 15, which is a perspective view of a camera module according to the 3rd embodiment of the present disclosure. In this embodiment, a camera module 3 includes the optical image stabilizer 1 disclosed in the 1st embodiment, an optical imaging unit 31 and a driving device 32. However, in other configurations, the camera module 3 may include the optical image stabilizer in the 2nd embodiment, and the present disclosure is not limited thereto. The optical imaging unit 31 can be an optical system. The imaging light converges in the optical imaging unit 31 of the camera module 3 to generate an image with the driving device 32 utilized for image focusing on an image surface of the optical imaging unit 31, the generated image then becomes an optical image signal received by the image sensor 15, the optical image signal is converted into an electrical image signal by the image sensor 15, and the electrical image signal is then digitally transmitted to other processing unit for further image processing.

The driving device 32 can have auto focusing functionality, and different driving configurations can be obtained through the usages of voice coil motors (VCM), micro electro-mechanical systems (MEMS), piezoelectric systems, or shape memory alloy materials. The driving device 32 is favorable for obtaining a better imaging position of the optical imaging unit 31, so that a clear image of the imaged object can be captured by the optical imaging unit 31 with different object distances.

Figure 16:
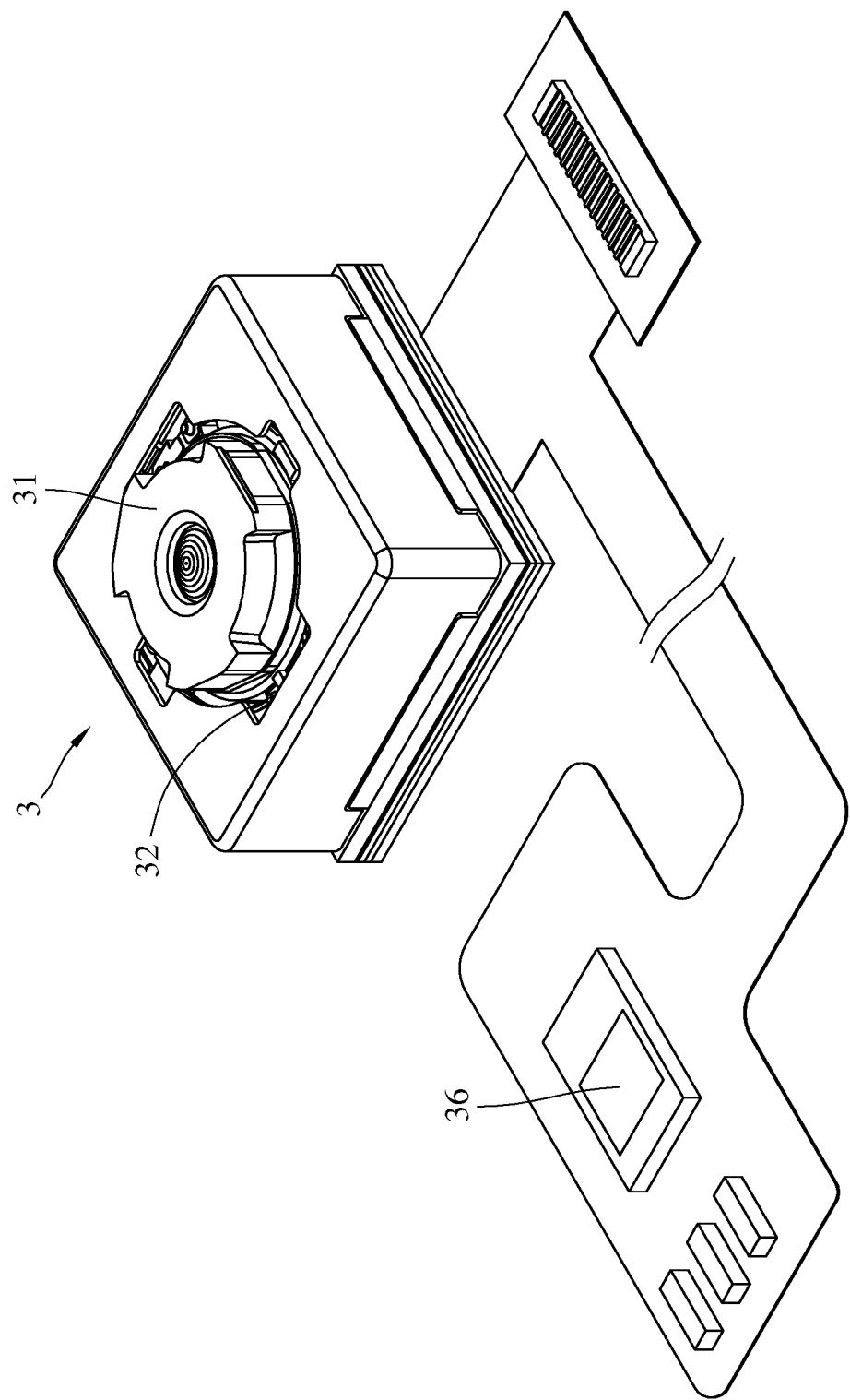
FIG. 16 is a perspective view of a camera module according to another embodiment of the present disclosure.

The present disclosure is not limited to the camera module 3 in FIG. 15. FIG. 16 is a perspective view of a camera module according to another embodiment of the present disclosure, wherein the camera module 3 further includes a flash module 36, which can be activated for light supplement when capturing images to improve image quality.

Figure 17:
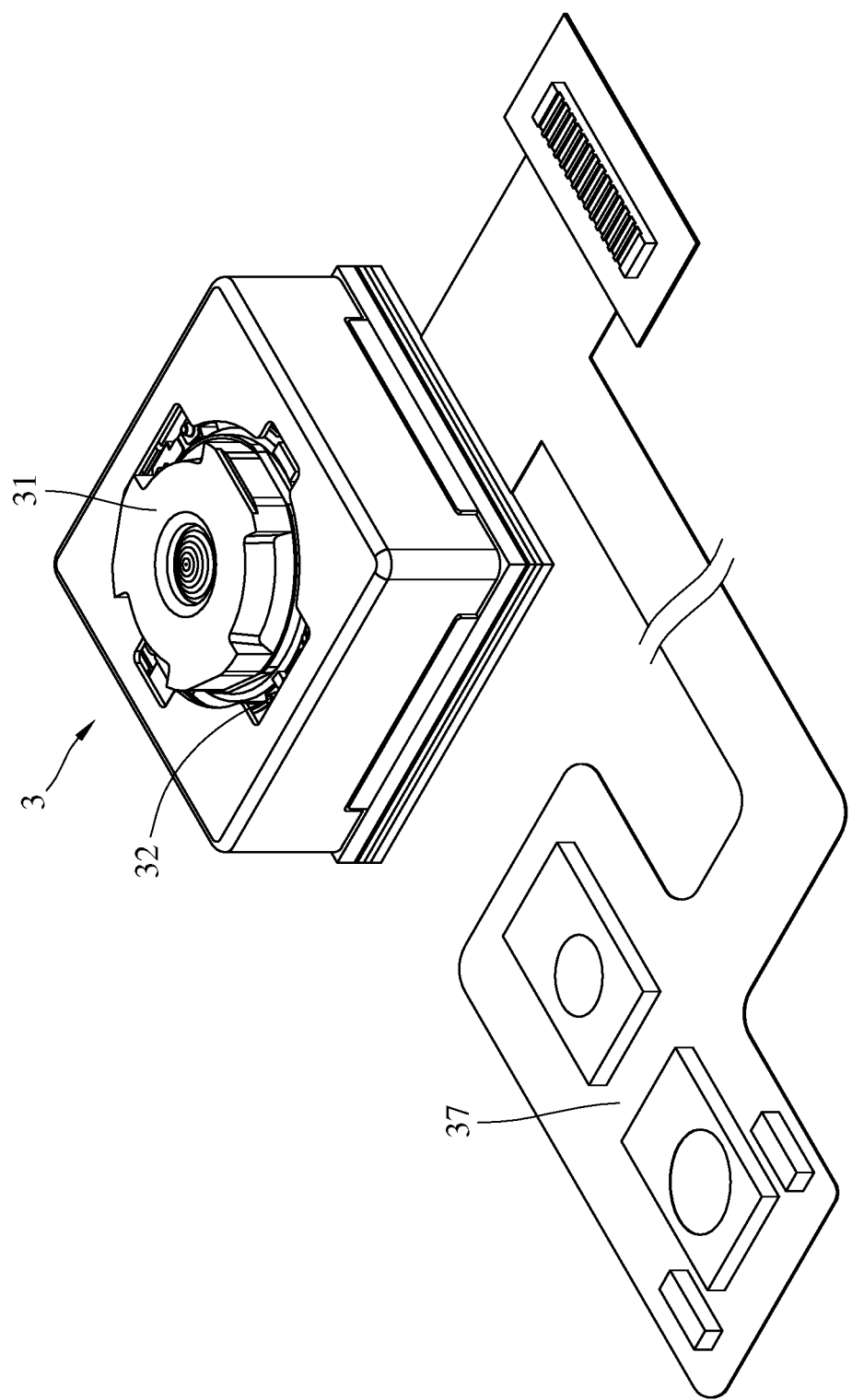
FIG. 17 is a perspective view of a camera module according to further another embodiment of the present disclosure.

FIG. 17 is a perspective view of a camera module according to further another embodiment of the present disclosure, wherein the camera module 3 further includes a focus assist module 37 configured to detect an object distance to achieve fast auto focusing. The light beam emitted from the focus assist module 37 can be either conventional infrared or laser.

4th Embodiment

Figure 18:
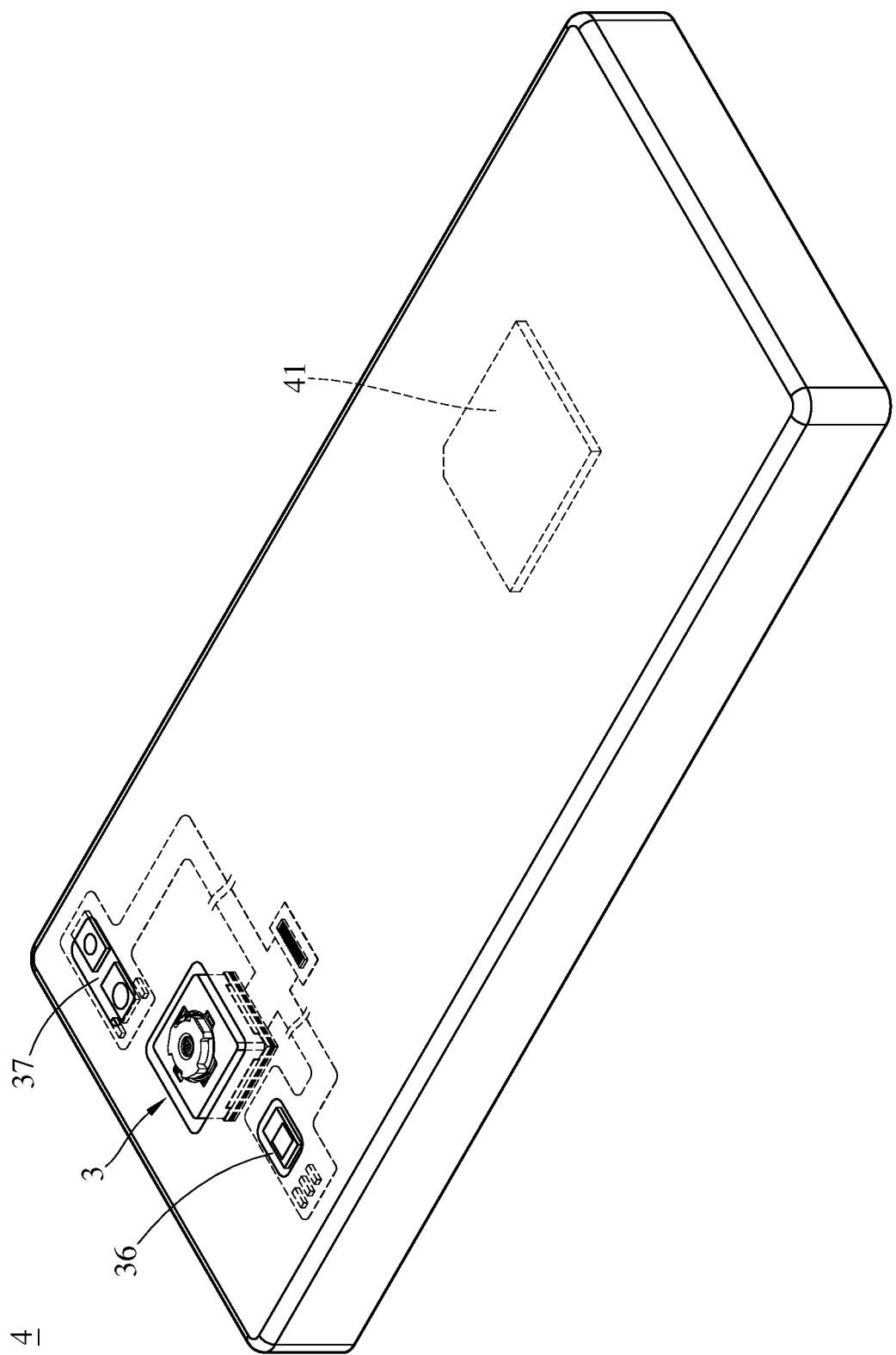
FIG. 18 is a perspective view of an electronic device according to the 4th embodiment of the present disclosure.
Figure 19:
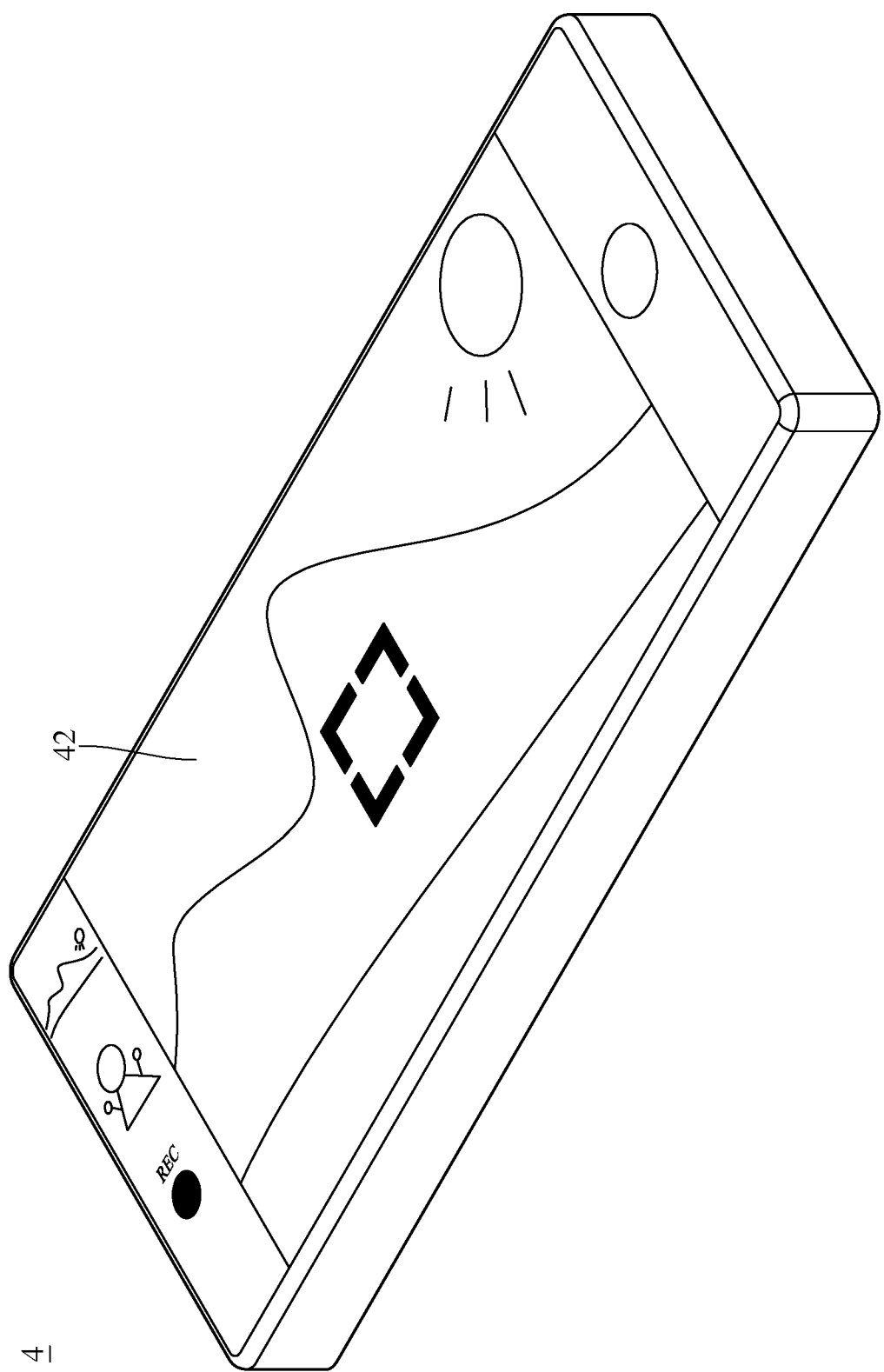
FIG. 19 is another perspective view of the electronic device in FIG. 18.
Figure 20:
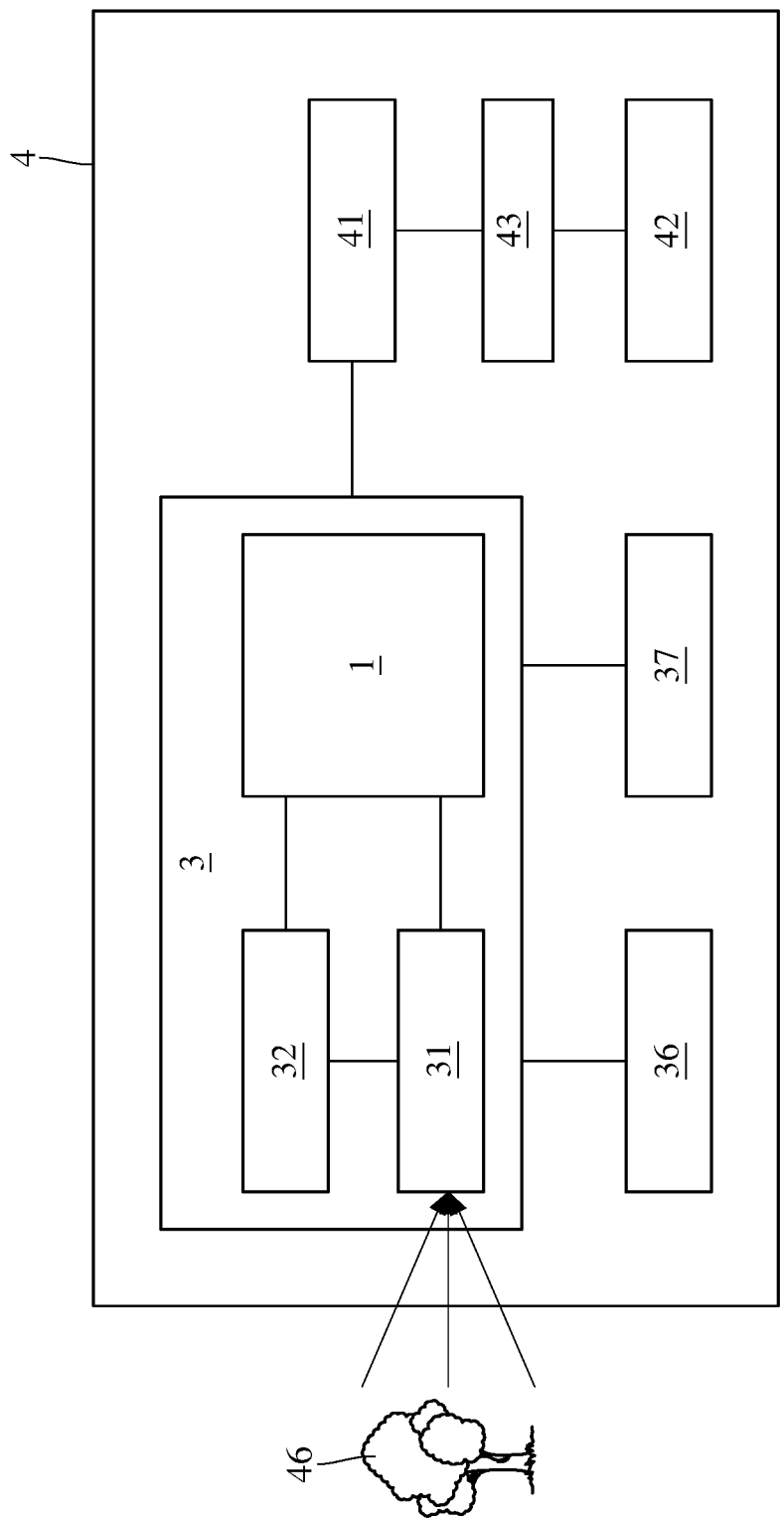
FIG. 20 is a block diagram of the electronic device in FIG. 18.

Please refer to FIG. 18 to FIG. 20, where FIG. 18 is a perspective view of an electronic device according to the 4th embodiment of the present disclosure, FIG. 19 is another perspective view of the electronic device in FIG. 18, and FIG. 20 is a block diagram of the electronic device in FIG. 18.

In this embodiment, an electronic device 4 is a smartphone including the camera module 3 disclosed in the 3rd embodiment, an image signal processor 41, a display unit (user interface) 42 and an image software processor 43. In this embodiment, the camera module 3 includes the optical image stabilizer 1, the optical imaging unit 31 and the driving device 32, and the camera module 3 further includes the flash module 36 and the focus assist module 37.

When a user captures images of an object 46, the light rays converge in the camera module 3 to generate an image, and the flash module 36 is activated for light supplement. The focus assist module 37 detects the object distance of the imaged object 46 to achieve fast auto focusing. The image signal processor 41 is configured to optimize the captured image to improve image quality. The light beam emitted from the focus assist module 37 can be either conventional infrared or laser. The display unit 42 can be a touch screen or have a physical shutter button. The user is able to interact with the display unit 42 and the image software processor 43 having multiple functions to capture images and complete image processing. The image processed by the image software processor 43 can be displayed on the display unit 42.

Figure 21:
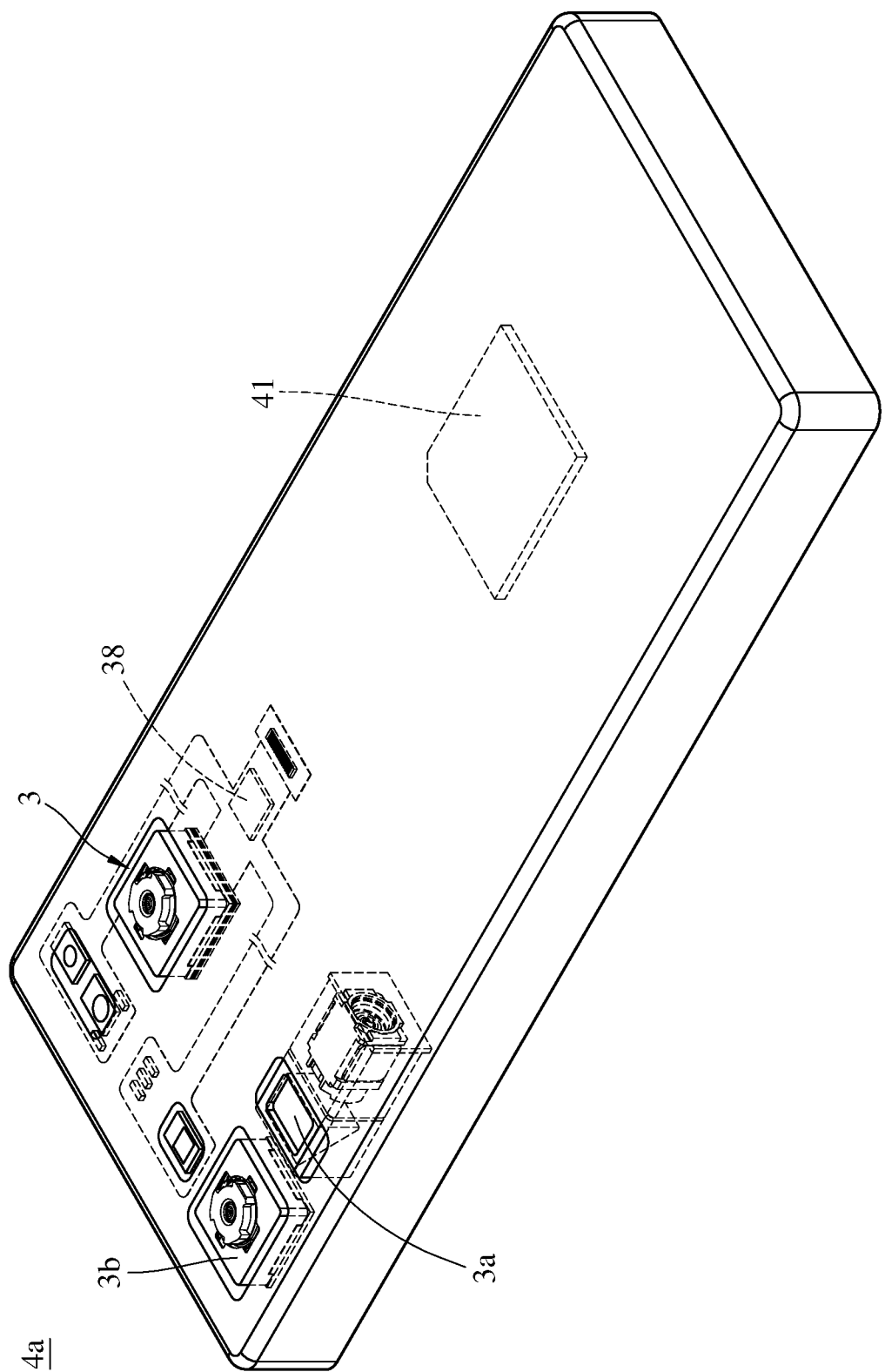
FIG. 21 is a perspective view of an electronic device according to still further another embodiment of the present disclosure.

The electronic device of the present disclosure is not limited to the number of camera modules as described above. FIG. 21 is a perspective view of an electronic device according to still further another embodiment of the present disclosure. An electronic device 4a is similar to the electronic device 4, and the electronic device 4a further includes a camera module 3a and a camera module 3b. The camera module 3, the camera module 3a and the camera module 3b all face the same direction and each has a single focal point. In addition, the camera module 3, the camera module 3a and the camera module 3b have different fields of view (e.g., the camera module 3a is a telephoto camera module, the camera module 3b is a wide-angle camera module, and the camera module 3 has a field of view ranging between the camera module 3a and the camera module 3b), such that the electronic device 4a has various magnification ratios so as to meet the requirement of optical zoom functionality. Furthermore, in this embodiment, the camera module 3 further includes an expansion image signal processor 38. When the camera module 3 works with the telephoto camera module 3a and the wide-angle camera module 3b, the expansion image signal processor 38 provides zoom functionality for images on the touch screen so as to meet image processing requirements for multiple camera modules. The electronic device 4a equipped with the camera module 3 has various modes of different photographing functions, such as zoom function, telephotography, multi-camera recording, selfie-optimized function, and high dynamic range (HDR) and 4 K resolution imaging under low-light conditions.

The smartphone in this embodiment is only exemplary for showing the optical image stabilizer of the present disclosure installed in an electronic device, and the present disclosure is not limited thereto. The optical image stabilizer can be optionally applied to optical systems with a movable focus. Furthermore, the optical image stabilizer features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image stabilizer, comprising:
an electric circuit member, comprising:
   a fixed part;
   a movable part, wherein the fixed part surrounds the movable part; and
   a connection part, connected to the fixed part and the movable part, wherein the movable part is movable with respect to the fixed part through the connection part;
an image sensor, wherein the image sensor is electrically connected to the electric circuit member and disposed on the movable part, and the image sensor is configured to convert an optical image signal into an electrical image signal;
a driving member, coupled to the movable part to move the movable part with respect to the fixed part on a plane substantially in parallel with the image sensor; and
a pressing member, coupled to the movable part to keep the movable part on the plane substantially in parallel with the image sensor;
wherein the connection part comprises a plurality of wire structures that are connected to and located between the fixed part and the movable part;
wherein the plurality of wire structures have pliability, the plurality of wire structures are connected to the movable part with no physical support, and each of the plurality of wire structures comprises:
   a circuit layer, configured to transmit the electrical image signal; and
   an insulation layer, stacked on the circuit layer,
wherein a layer where the driving member and the pressing member are located is different from a layer where the fixed part, the movable part or the connection part is located.

2. The optical image stabilizer according to claim 1, wherein the driving member comprising:
a first driving member, coupled to the movable part in a first direction to move the movable part with respect to the fixed part along the first direction; and
a second driving member, coupled to the movable part in a second direction to move the movable part with respect to the fixed part along the second direction, wherein the second direction is orthogonal to the first direction.

3. The optical image stabilizer according to claim 2, wherein each of the first driving member and the second driving member comprises at least one shape memory alloy.

4. The optical image stabilizer according to claim 2, wherein each of the first driving member and the second driving member comprises at least one piezoelectric material.

5. The optical image stabilizer according to claim 1, wherein the fixed part, the movable part and the connection part of the electric circuit member are substantially located on a same plane.

6. The optical image stabilizer according to claim 1, further comprising a plastic member disposed on the movable part, wherein the plastic member has an opening that surrounds the image sensor.

7. The optical image stabilizer according to claim 1, wherein a number of the plurality of wire structures is N, and the following condition is satisfied:
N≥10.

8. The optical image stabilizer according to claim 1, wherein each of the plurality of wire structures comprises at least one curved portion that has a curved shape, and the curved portions are located between two ends of the plurality of wire structures.

9. The optical image stabilizer according to claim 1, wherein a number of the insulation layers in each of the plurality of wire structures is two, the circuit layer in each of the plurality of wire structures is disposed between the two insulation layers, and at least one of the two insulation layers has a blackened surface.

10. The optical image stabilizer according to claim 1, wherein a width of a cross section of each of the plurality of wire structures is d, a distance between two ends of each of the plurality of wire structures is W, and the following condition is satisfied:
d/W≤0.2.

11. A camera module, comprising:
an optical imaging unit; and
the optical image stabilizer of claim 1, wherein the image sensor of the optical image stabilizer is disposed on an image surface of the optical imaging unit.

12. An electronic device, comprising:
the camera module of claim 11.

* * * * *